(12) United States Patent
Yoshida et al.

(10) Patent No.: US 8,650,334 B2
(45) Date of Patent: Feb. 11, 2014

(54) SOURCE DEVICE, SINK DEVICE, SYSTEM, AND RECORDING MEDIUM

(75) Inventors: Tatsuya Yoshida, Osaka (JP); Tomohiro Nagano, Osaka (JP); Kenichi Kimura, Osaka (JP); Tadamichi Atsumi, Osaka (JP); Taisuke Hara, Osaka (JP); Shuji Daioku, Osaka (JP); Kyohichiroh Sawachika, Osaka (JP); Koji Osaki, Osaka (JP); Ryutaro Mashiko, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/698,248

(22) PCT Filed: May 19, 2011

(86) PCT No.: PCT/JP2011/061585
§ 371 (c)(1),
(2), (4) Date: Nov. 15, 2012

(87) PCT Pub. No.: WO2011/145701
PCT Pub. Date: Nov. 24, 2011

(65) Prior Publication Data
US 2013/0057762 A1 Mar. 7, 2013

(30) Foreign Application Priority Data

May 19, 2010 (JP) .................................. 2010-115669
May 19, 2011 (JP) .................................. 2011-112796

(51) Int. Cl.
*G06F 3/00* (2006.01)
*H04N 7/00* (2011.01)
*H04N 5/445* (2011.01)
*H04N 5/44* (2011.01)
*G06F 3/038* (2013.01)
*G06F 15/16* (2006.01)

(52) U.S. Cl.
USPC ................... 710/19; 710/15; 710/16; 710/17; 710/18; 348/552; 348/563; 348/564; 348/725; 348/E07.001; 348/E5.096; 348/E5.105; 345/207; 709/208

(58) Field of Classification Search
None
See application file for complete search history.

(56) References Cited

U.S. PATENT DOCUMENTS 6,262,763 B1 * 7/2001 Totsuka et al. ................ 348/135
7,206,029 B2 * 4/2007 Cohen-Solal ................ 348/565

(Continued)

FOREIGN PATENT DOCUMENTS

JP 2002-300239 A 10/2002
JP 2003-92630 A 3/2003

(Continued)

OTHER PUBLICATIONS

Hitachi, Ltd. et al. "High-Definition Multimedia Interface Specification", Version 1.3a, Nov. 10, 2006.

(Continued)

*Primary Examiner* — Henry Tsai
*Assistant Examiner* — Jing-Yin Shyu
(74) *Attorney, Agent, or Firm* — Birch, Stewart, Kolasch & Birch, LLP

(57) ABSTRACT

A source device such as a mobile phone terminal can provide more surely a user with a notification of a status of the source device. A mobile phone terminal (2) serving as the source device includes a command processing section (304) which issues a command which (A) has an event ID which designates a status of the source device and (B) causes a TV (1) to display the status of the source device.

18 Claims, 15 Drawing Sheets

(56) References Cited

U.S. PATENT DOCUMENTS

| | | | |
|---|---|---|---|
| 7,224,404 B2 * | 5/2007 | An et al. | 348/584 |
| 7,231,603 B2 * | 6/2007 | Matsumoto | 715/716 |
| 7,554,614 B2 * | 6/2009 | Satou | 348/734 |
| 8,334,621 B2 * | 12/2012 | Goto et al. | 307/126 |
| 8,340,499 B2 * | 12/2012 | Kikkawa et al. | 386/248 |
| 2005/0186988 A1 | 8/2005 | Lim et al. | |
| 2005/0227624 A1 * | 10/2005 | Hiddink et al. | 455/62 |
| 2007/0115389 A1 * | 5/2007 | McCarthy et al. | 348/461 |
| 2007/0142022 A1 * | 6/2007 | Madonna et al. | 455/352 |
| 2008/0005565 A1 | 1/2008 | Shiga et al. | |
| 2008/0019494 A1 * | 1/2008 | Toda | 379/142.16 |
| 2008/0069087 A1 * | 3/2008 | Igoe | 370/352 |
| 2008/0092199 A1 * | 4/2008 | McCarthy et al. | 725/133 |
| 2008/0247544 A1 * | 10/2008 | Candelore et al. | 380/241 |
| 2008/0271073 A1 * | 10/2008 | Kim et al. | 725/37 |
| 2009/0042556 A1 | 2/2009 | Saito | |
| 2009/0077603 A1 | 3/2009 | Yoshikawa et al. | |
| 2009/0079869 A1 * | 3/2009 | Kim | 348/553 |
| 2009/0141180 A1 * | 6/2009 | Kondo et al. | 348/723 |
| 2009/0177818 A1 * | 7/2009 | Shim et al. | 710/100 |
| 2009/0262256 A1 * | 10/2009 | Asayama et al. | 348/738 |
| 2009/0290065 A1 * | 11/2009 | Asayama et al. | 348/553 |
| 2009/0320073 A1 * | 12/2009 | Reisman | 725/51 |
| 2010/0033026 A1 * | 2/2010 | Goto et al. | 307/126 |
| 2010/0110294 A1 * | 5/2010 | Oka | 348/564 |
| 2010/0118193 A1 * | 5/2010 | Boyden et al. | 348/554 |
| 2010/0263016 A1 * | 10/2010 | Itoga | 725/153 |
| 2010/0298026 A1 * | 11/2010 | Goodman | 455/552.1 |
| 2010/0319037 A1 * | 12/2010 | Kim et al. | 725/81 |
| 2011/0113442 A1 * | 5/2011 | Kikkawa | 725/25 |
| 2011/0141218 A1 * | 6/2011 | Stancato | 348/14.01 |
| 2011/0176056 A1 * | 7/2011 | Toba | 348/552 |

FOREIGN PATENT DOCUMENTS

| | | |
|---|---|---|
| JP | 2003-199164 A | 7/2003 |
| JP | 2004-112109 A | 4/2004 |
| JP | 2005-20541 A | 1/2005 |
| JP | 2005-269557 A | 9/2005 |
| JP | 2006-121685 A | 5/2006 |
| JP | 2006-287829 A | 10/2006 |
| JP | 2007-201916 A | 8/2007 |
| JP | 2007-318653 A | 12/2007 |
| JP | 2008-4108 A | 1/2008 |
| JP | 2008-9777 A | 1/2008 |
| JP | 2009-76981 A | 4/2009 |
| JP | 2009-89274 A | 4/2009 |
| JP | 2009-136030 A | 6/2009 |
| JP | 2009-200887 A | 9/2009 |
| JP | 2010-98378 A | 4/2010 |

OTHER PUBLICATIONS

International Search Report issued in PCT/JP2011/061585 mailed Aug. 23, 2011.

* cited by examiner

FIG. 7

| Format_ID | PRESENCE/ABSENCE OF GUIDE DISPLAY | | | | | | | | | |
|---|---|---|---|---|---|---|---|---|---|---|
| 0000 | PRIORITY ORDER | EVENT ID | | | | | | | | |
| 0001 | PRIORITY ORDER | EVENT ID | Parameter1 | | | | | | | |
| 0010 | PRIORITY ORDER | EVENT ID | Parameter1 | Parameter2 | | | | | | |
| 0011 | PRIORITY ORDER | EVENT ID | DISPLAY TIME PERIOD | DISPLAY LOCATION | | | | | | |
| 0100 | PRIORITY ORDER | EVENT ID | DISPLAY TIME PERIOD | DISPLAY LOCATION | Parameter1 | | | | | |
| 0101 | PRIORITY ORDER | EVENT ID | DISPLAY TIME PERIOD | DISPLAY LOCATION | Parameter1 | Parameter2 | | | | |
| 0110 | PRIORITY ORDER | EVENT ID | DISPLAY TIME PERIOD | DISPLAY LOCATION | ICON ID | SOUND EFFECT ID | | | | |
| 0111 | PRIORITY ORDER | EVENT ID | DISPLAY TIME PERIOD | DISPLAY LOCATION | ICON ID | SOUND EFFECT ID | Parameter1 | | | |
| 1000 | PRIORITY ORDER | EVENT ID | DISPLAY TIME PERIOD | DISPLAY LOCATION | ICON ID | SOUND EFFECT ID | Parameter1 | Parameter2 | | |
| 1001 | PRIORITY ORDER | EVENT ID | DISPLAY TIME PERIOD | DISPLAY LOCATION | ICON ID | SOUND EFFECT ID | TEXT COLOR | BACKGROUND COLOR | | |
| 1010 | PRIORITY ORDER | EVENT ID | DISPLAY TIME PERIOD | DISPLAY LOCATION | ICON ID | SOUND EFFECT ID | TEXT COLOR | BACKGROUND COLOR | Parameter1 | |
| 1011 | PRIORITY ORDER | EVENT ID | DISPLAY TIME PERIOD | DISPLAY LOCATION | ICON ID | SOUND EFFECT ID | TEXT COLOR | BACKGROUND COLOR | Parameter1 | Parameter2 |
| 1100 | CHARACTER STRING ORDER | CHARACTER STRING (8 Bytes) | | | | | | | | |
| 1101 | Reserve | | | | | | | | | |
| 1110 | Reserve | | | | | | | | | |
| 1111 | Reserve | | | | | | | | | |

F I G. 8
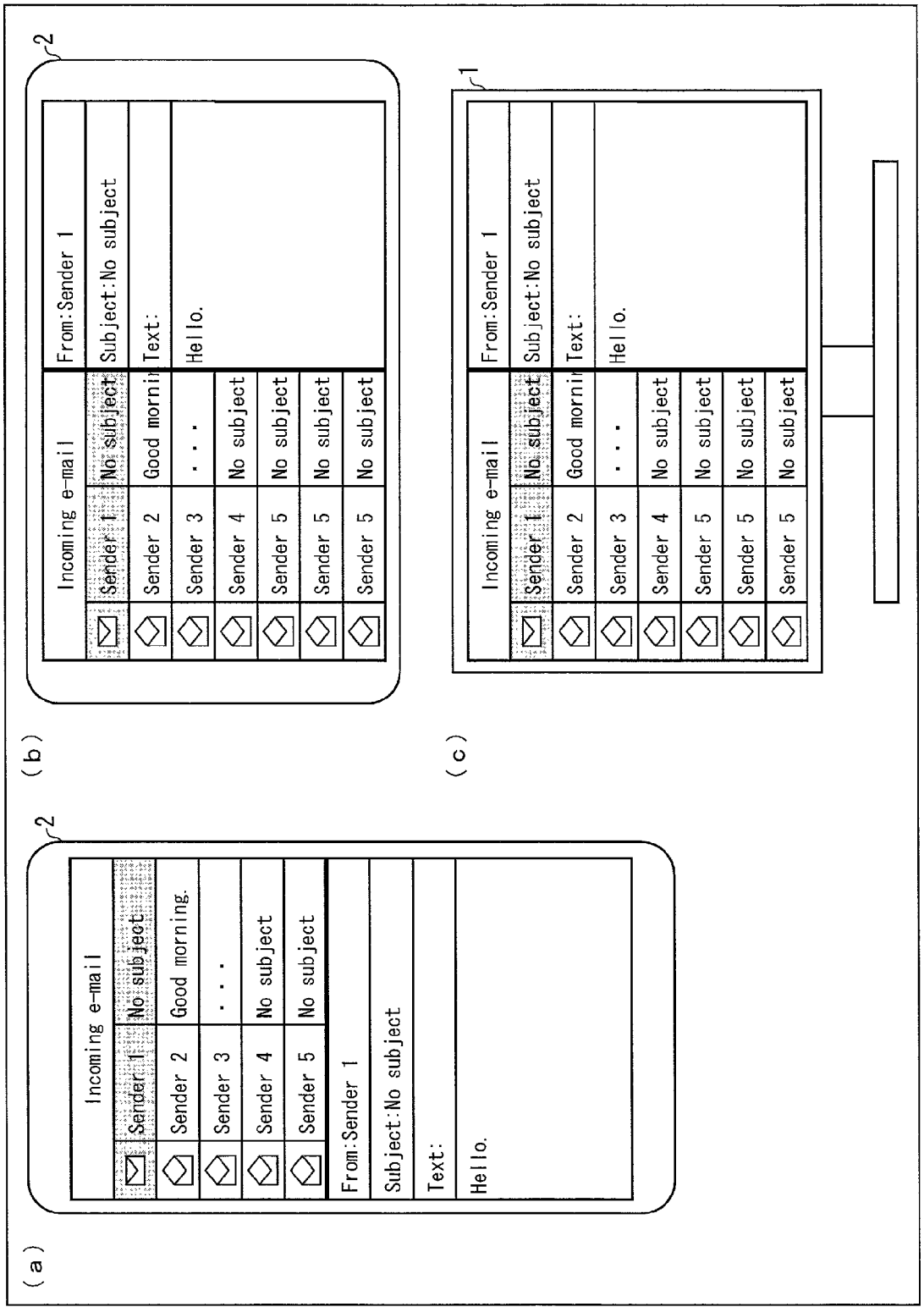

F I G. 1 0
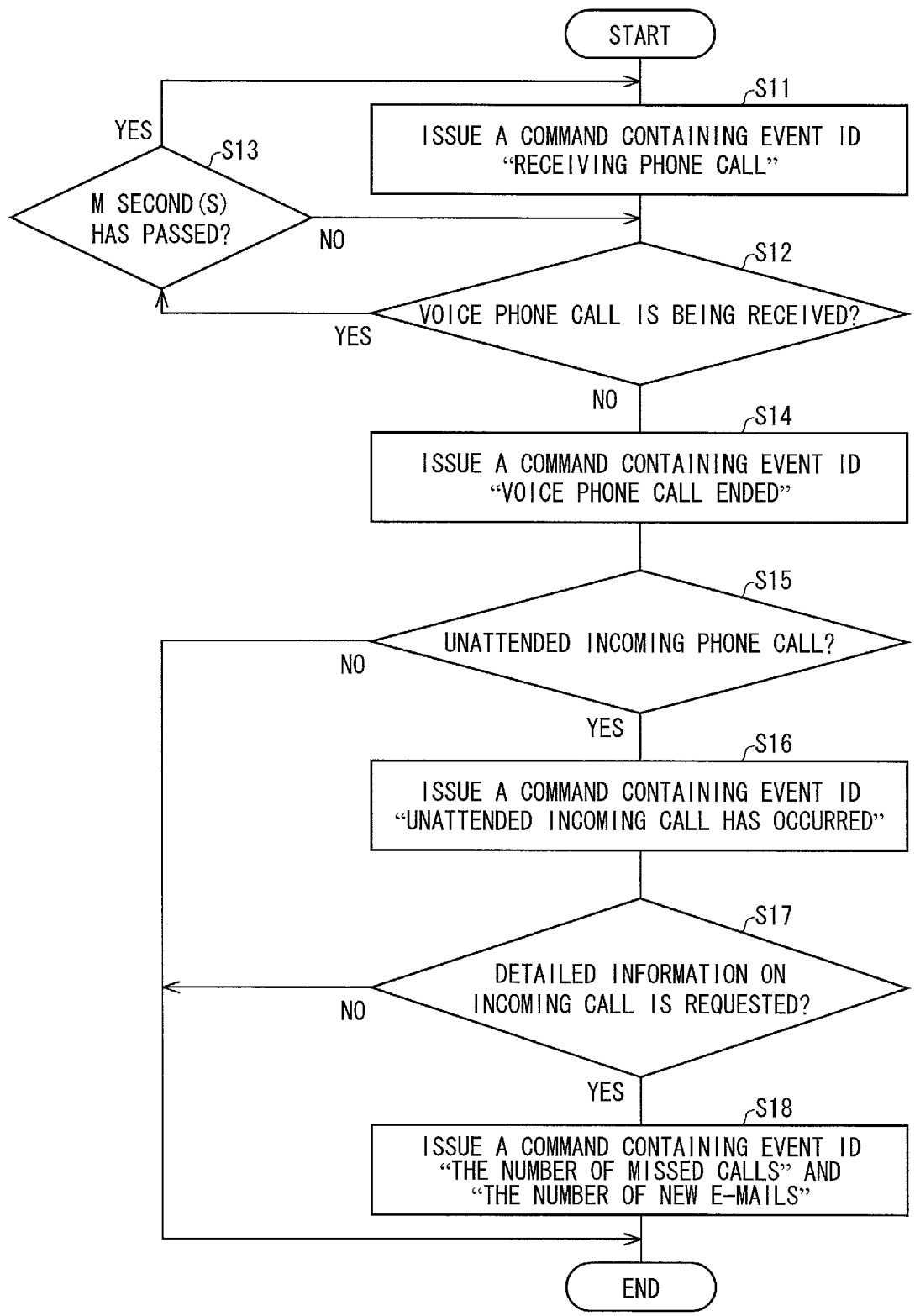

F I G. 1 1
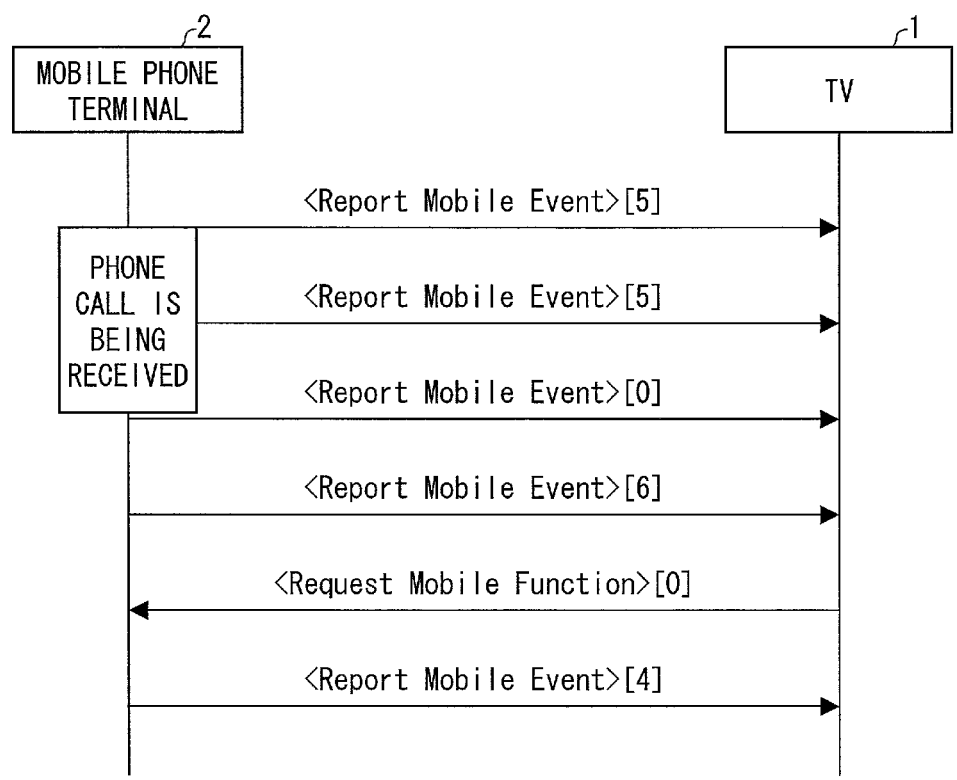

F I G. 1 4
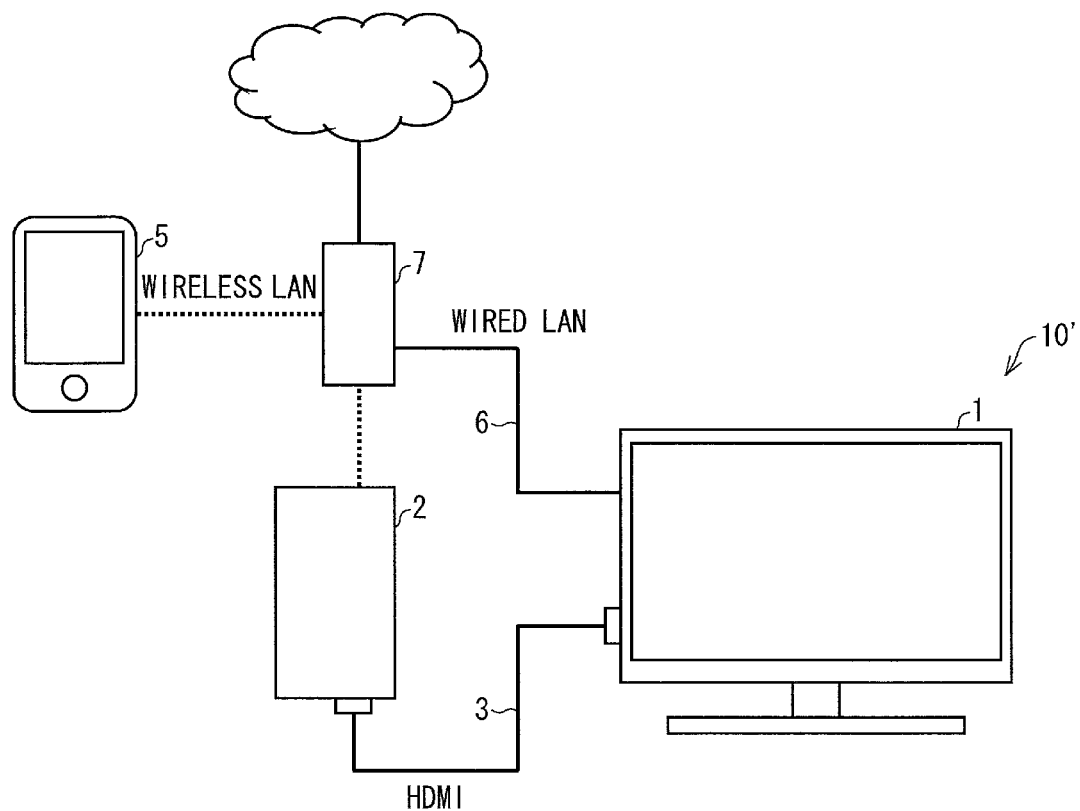

F I G. 15
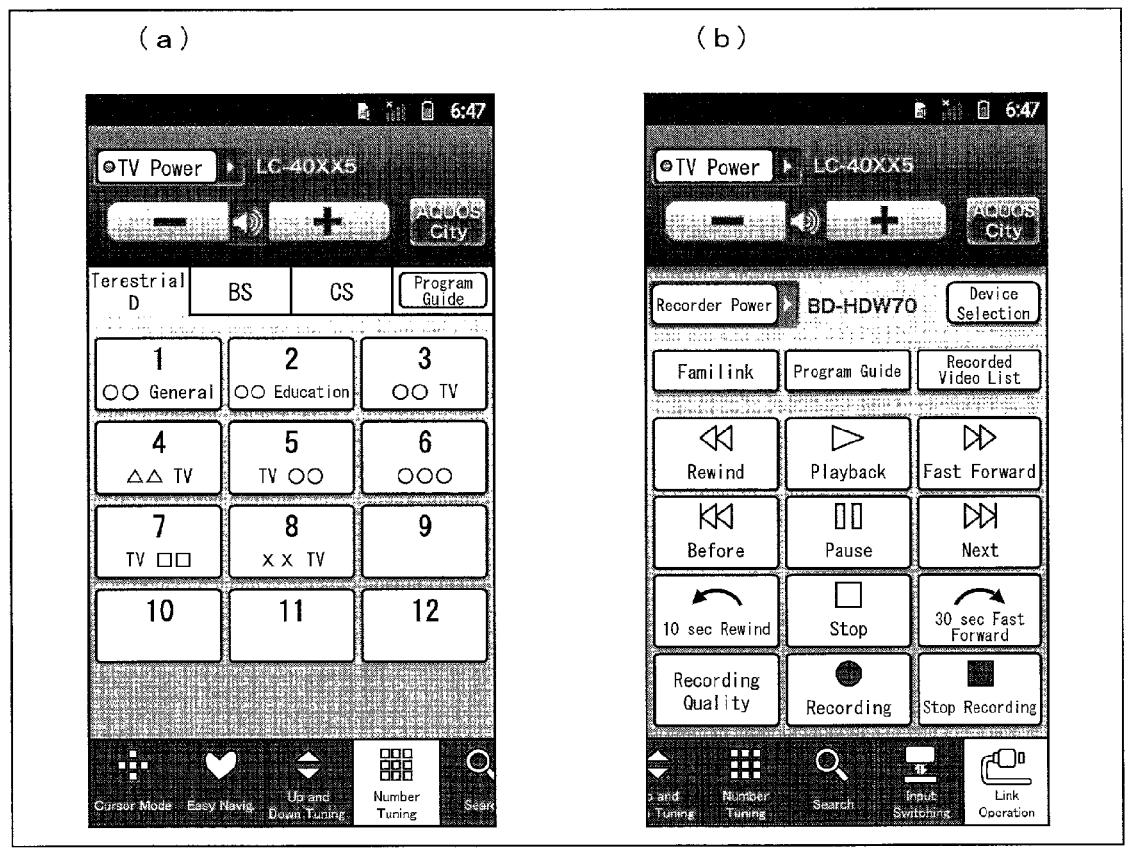

SOURCE DEVICE, SINK DEVICE, SYSTEM, AND RECORDING MEDIUM

TECHNICAL FIELD

The present invention relates to a source device for supplying content to a sink device, the sink device for outputting the content supplied from the sink device, and a system including the source device and the sink device. Further, the present invention relates to a program which causes a computer to operate as the source device and a recording medium in which the program is stored.

BACKGROUND ART

In recent years, televisions installed with the HDMI (High-Definition Multimedia Interface) have become widespread, and it is becoming common to connect a television with a source device via an HDMI cable. A television and a source device connected to each other via an HDMI cable transmit and receive not only video signals and audio signals but also CEC (Consumer Electronics Control) commands.

Use of the CEC command allows controlling a source device from a television and controlling a television from a source device. Therewith use of the CEC command allows users to enjoy convenience, which have not been provided so far. For example, it is possible to automatically switch an input source for the television to a source device that has started to playback content. See, for example, Non Patent Literature 1 for details of HDMI.

Further, because a Micro•HDMI connecter was standardized, it is assumed that use cases where a portable device and a television are connected to each other via HDMI and content played in the portable device is displayed to the television will increase. For example, recent mobile phone terminals have functions for playing still-image content, video-image content, and audio content, so that the recent mobile phone terminals can be used as the source devices. The same applies to portable devices such as PDA, portable digital audio player, and digital camera.

Note that Patent Literatures 1 through 4 each disclose a technique in which a mobile phone terminal provides a user with a notification of a status of the mobile phone terminal itself, such as receiving of a voice phone call and receiving of e-mails.

CITATION LIST

Patent Literatures
Patent Literature 1
Japanese Patent Application Publication, Tokukai, No. 2003-199164 A (Publication Date: Jul. 11, 2003)
Patent Literature 2
Japanese Patent Application Publication, Tokukai, No. 2005-20541 A (Publication Date: Jan. 20, 2005)
Patent Literature 3
Japanese Patent Application Publication, Tokukai, No. 2007-318653 A (Publication Date: Dec. 6, 2007)
Patent Literature 4
Japanese Patent Application Publication, Tokukai, No. 2008-4108 A (Publication Date: Jan. 10, 2008)
Non Patent Literature
Non Patent Literature 1
High-Definition Multimedia Interface Specification Version 1.3a, Nov. 10, 2006

SUMMARY OF INVENTION

Technical Problem

A mobile phone terminal is generally placed in the vicinity of a user. However, in a case where a television and the mobile phone terminal establish a wired connection via an HDMI cable etc., it is highly possible that the mobile phone terminal is placed in the vicinity of not the user but the television. In this case, it is difficult to provide a user with a notification of a status of the mobile phone terminal by means of the conventional arts.

The present invention has been made in view of the aforementioned problem, and an object of the present invention is that a source device, such as a mobile phone terminal, more surely provides a user with a notification of a status of the source device.

Solution to Problem

In order to achieve the object, a source device in accordance with the present invention is for supplying, to a sink device, content to be outputted by the sink device, and the source device includes command issue means for issuing a command which (A) contains status designation information which designates a status of the source device and (B) causes the sink device to display the status of the source device.

According to the arrangement, the sink device displays the status of the source device on the basis of the status designation information contained in the command. A user can therefore know the status of the source device by watching such display of the sink device. That is, it is possible to more surely provide the user with a notification of the status of the source device.

In order to achieve the aforementioned object, a sink device in accordance with the present invention is for outputting content supplied from a source device, and the sink device includes status display means for displaying, in accordance with a command which (A) is issued by the source device and (B) contains status designation information which designates a status of the source device, the status of the source device designated by the status designation information.

According to the arrangement, the sink device displays the status of the source device on the basis of the status designation information contained in the command. A user can therefore know the status of the source device by watching such display content of the sink device. That is, it is possible to more surely provide the user with a notification of the status of the source device.

For a fuller understanding of the nature and advantages of the invention, reference should be made to the ensuing detailed description taken in conjunction with the accompanying drawings.

Advantageous Effects of Invention

According to the present invention, a status of a source device is displayed to a sink device. This makes it possible to more surely provide a user with a notification of the status of the source device.

BRIEF DESCRIPTION OF DRAWINGS

FIG. 1 is a functional block diagram showing functions of a mobile phone terminal according to an embodiment of the present invention.

FIG. 2 is a view showing a configuration of a system including the mobile phone terminal illustrated in FIG. 1 and a TV (television receiver).

FIG. 3 is a view illustrating other aspects of a connection between the mobile phone terminal illustrated in FIG. 2 and the TV; (a) of FIG. 3 illustrates an aspect of a connection using a charging stand, (b) of FIG. 3 illustrates an aspect of a connection using a charging stand from which electric power is supplied from the TV, and (c) of FIG. 3 illustrates an aspect of a connection in which the mobile phone terminal is loaded into a slot provided in the TV.

FIG. 4 is a block diagram showing a configuration of the TV illustrated in FIG. 2.

FIG. 5 is a block diagram showing a configuration of the mobile phone terminal illustrated in FIG. 2.

FIG. 6 is a block diagram showing a configuration of an HDMI receiver provided in the TV illustrated in FIG. 2 and a configuration of an HDMI transmitter provided in the mobile phone terminal illustrated in FIG. 2.

FIG. 7

FIG. 7 is a view illustrating an example data format which is transmitted, together with a <Report Mobile Event> command, to a television.

FIG. 8

FIG. 8 is views illustrating example incoming e-mail screens: (a) and (b) of FIG. 8 are each an example incoming e-mail screen which is displayed by an LCD of a mobile phone terminal; and (c) of FIG. 8 is an example incoming e-mail screen which is displayed by an LCD of a television.

FIG. 9 is a view showing an example configuration of a display screen including an event screen: (a) of FIG. 9 is an example display, on a display screen, illustrated in a case where a mobile phone terminal receives a voice phone call; and (b) of FIG. 9 is an example display, on a display screen, illustrated in a case where a mobile phone terminal has received an e-mail.

FIG. 10

FIG. 10 is a flowchart showing a flow of a command issue process in the mobile phone terminal of FIG. 2 when the mobile phone terminal receives a voice phone call.

FIG. 11

FIG. 11 is a sequence diagram showing an example of how a command issue process in the mobile phone terminal of FIG. 2 is carried out when the mobile phone terminal receives a voice phone call.

FIG. 12 is a flowchart showing a flow of a command issue process in the mobile phone terminal of FIG. 2 when the mobile phone terminal receives an e-mail.

FIG. 13 is a sequence diagram showing an example of how a command issue process in the mobile phone terminal of FIG. 2 is carried out when the mobile phone terminal receives an e-mail.

FIG. 14

FIG. 14 is a block diagram illustrating one construction example of a system capable of operating a TV and a source device from a portable information terminal.

FIG. 15

FIG. 15 is a view showing a configuration example of a display screen displayed on a touch panel of a portable information terminal; (a) of FIG. 15 is a display screen for operating a TV, and (b) of FIG. 15 is a display screen for operating a source device.

DESCRIPTION OF EMBODIMENTS

The following description will discuss an embodiment of the present invention with reference to drawings. Note that, in description below, a source device is exemplified by a mobile phone terminal, and a sink device is exemplified by a television receiver (hereinafter referred to as "TV"). The present invention is, however, not limited to these devices. In particular, the mobile phone terminal is merely an example of a portable device that functions as a source device, and the present invention is also applicable to other portable devices such as a PDA (Personal Digital Assistant), a portable digital audio player, and a digital camera.

[System Configuration]

Figure 2:
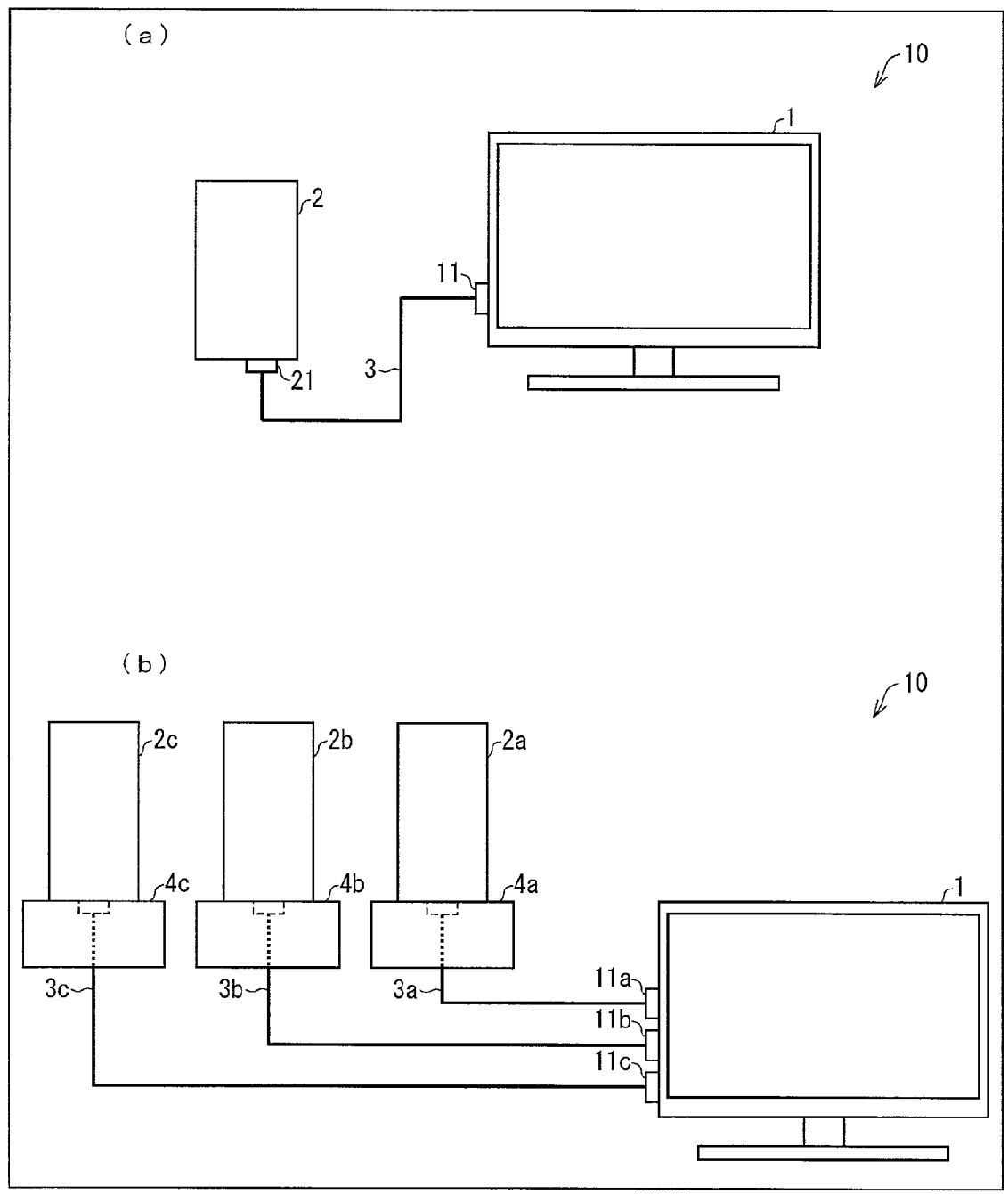
FIG. 2

A configuration of a system 10 including a TV 1 and a mobile phone terminal 2 will be described with reference to FIG. 2. FIG. 2 is a view illustrating a configuration of the system 10.

As illustrated in (a) of FIG. 2, the system 10 includes a TV 1 having an HDMI input terminal 11 and a mobile phone terminal 2 having an HDMI output terminal 21. The system 10 is established by connecting, via an HDMI cable 3, the HDMI input terminal 11 of the TV 1 with the HDMI output terminal 21 of the mobile phone terminal 2. In the system 10, the mobile phone terminal 2 functions as a source device that supplies content to the TV 1, and the TV 1 functions as a sink device that outputs the content supplied from the mobile phone terminal 2. The content, supplied from the mobile phone terminal 2 and outputted by the TV 1, can be video, audio, or both video and audio.

As illustrated in (b) of FIG. 2, the system 10 can include (i) a TV 1 having N (three (3) in the embodiment) HDMI input terminals 11a through 11c and (ii) not more than N (three (3) in the embodiment) mobile phone terminals 2a through 2c. In this case, the HDMI input terminals 11a through 11c of the TV 1 are connected to the mobile phone terminals 2a through 2c via HDMI cables 3a through 3c, respectively. Note that, in the example illustrated in (b) of FIG. 2, an HDMI connection is established between the TV 1 and the mobile phone terminals 2a through 2c, by placing the mobile phone terminals 2a through 2c on respective stands 4a through 4c (charging stand 4 etc. later described). This causes each of the mobile phone terminals 2a through 2c to be connected to one ends of the respective HDMI cables 3a through 3c.

Note that how the TV 1 is connected with the mobile phone terminal 2 via HDMI is not limited to that illustrated in FIG. 2. It is alternatively possible to employ a configuration in which the TV 1 is connected to the mobile phone terminal 2 with use of a charging stand 4, as illustrated in (a) of FIG. 3 and (b) of FIG. 3.

Figure 3:
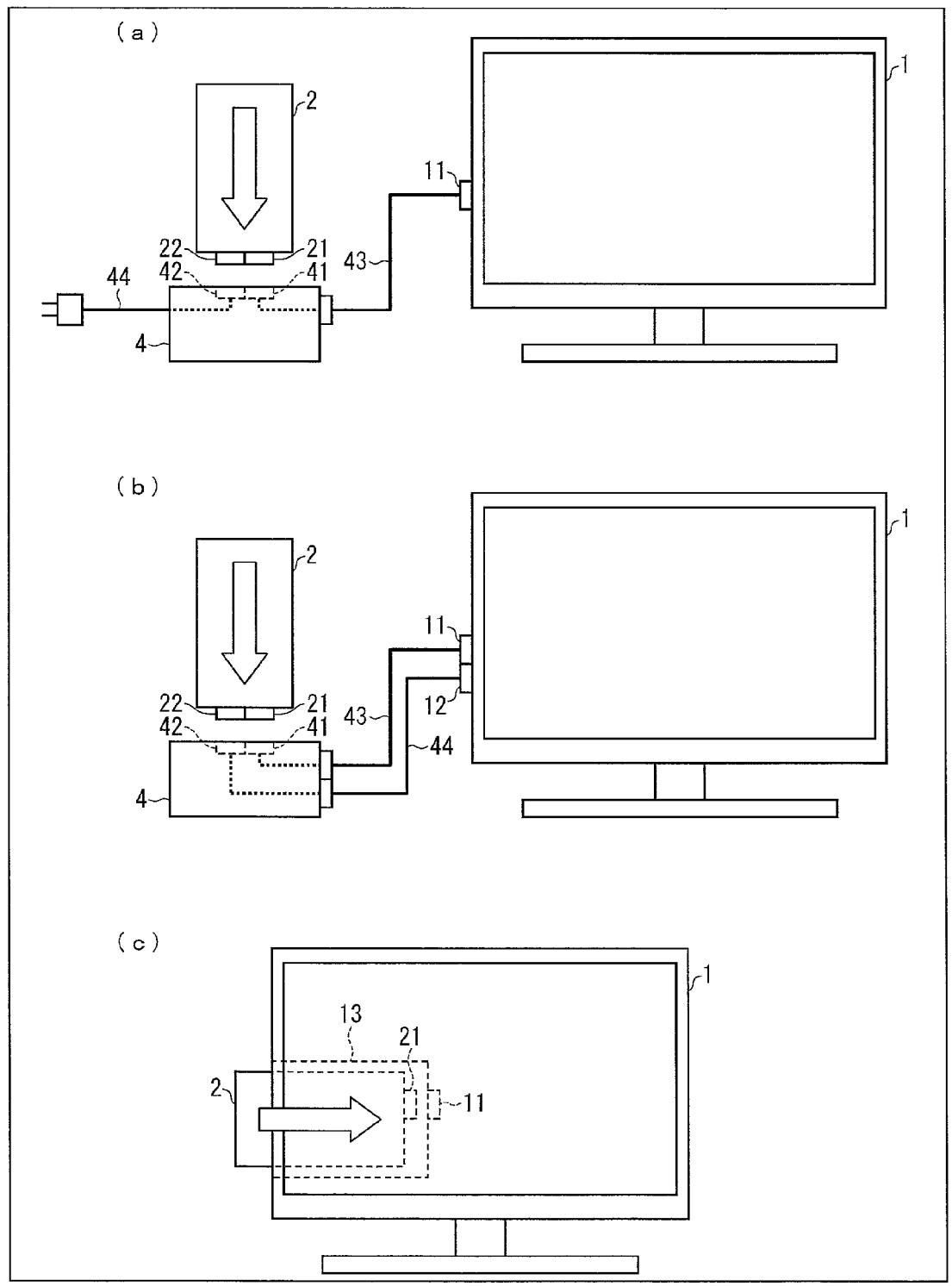
FIG. 3

The charging stand 4 illustrated in (a) of FIG. 3 has an HDMI input terminal 41 and a power terminal 42. When the mobile phone terminal 2 is placed on the charging stand 4, the HDMI output terminal 21 and the power terminal 22 of the mobile phone terminal 2 are connected with the HDMI input terminal 41 and the power terminal 42 of the charging stand 4, respectively. The TV 1 is connected to the mobile phone terminal 2 via HDMI, by (i) connecting the HDMI input terminal 41 of the charging stand 4 to one end of an HDMI cable 43 and (ii) connecting the other end of the HDMI cable 43 to the HDMI input terminal 11 of the TV 1. Meanwhile, it is possible to supply electric power to the mobile phone terminal 2, by (i) connecting the power terminal 42 of the charging stand 4 to one end of a power cable 44 and (ii) connecting an AC adapter provided on the other end of the power cable 44 to a commercial power source.

The charging stand 4 illustrated in (b) of FIG. 3 has, as with the charging stand 4 illustrated in (a) of FIG. 3, an HDMI input terminal 41 and a power terminal 42. When the mobile phone terminal 2 is placed on the charging stand 4, the HDMI output terminal 21 and the power terminal 22 of the mobile phone terminal 2 are connected with the HDMI input terminal 41 and the power terminal 42 of the charging stand 4, respectively. It is possible to connect the TV 1 to the mobile phone terminal 2 via HDMI, by (i) connecting the HDMI input terminal 41 to one end of an HDMI cable 43 and (ii) connecting the other end of the HDMI cable 43 to the HDMI input terminal 11 of the TV 1. Meanwhile, it is possible to supply electric power to the mobile phone terminal 2, by (i) connecting the power terminal 42 to one end of a power cable 44 and (ii) connecting the other end of the power cable 44 to an AC adapter 12 built-in in the TV 1. Note that an alternative configuration can be provided in which a single cable is used to double as the HDMI cable 43 and the power cable 44. This makes it possible to concurrently carry out the HDMI connection and the electric power supply with use of the single cable.

It is possible to employ another alternative configuration in which the TV 1 and the mobile phone terminal 2 are subjected to a direct HDMI connection, instead of using the HDMI cable 3, as illustrated in (c) of FIG. 3. The TV 1 illustrated in (c) of FIG. 3 has a slot 13. When the mobile phone terminal 2 is loaded to the slot 13, the HDMI output terminal 21 of the mobile phone terminal 2 is directly connected to the HDMI input terminal 11 of the TV 1 provided inside the slot 13. Note that, instead of the configuration in which the mobile phone terminal 2 is loaded to the TV 1 from a side surface of the TV 1, it is also possible to employ another configuration in which the mobile phone terminal 2 is loaded on a bezel section of the TV 1 (bezel section provided lower of the LCD) from the front.

[TV Configuration]

Figure 4:
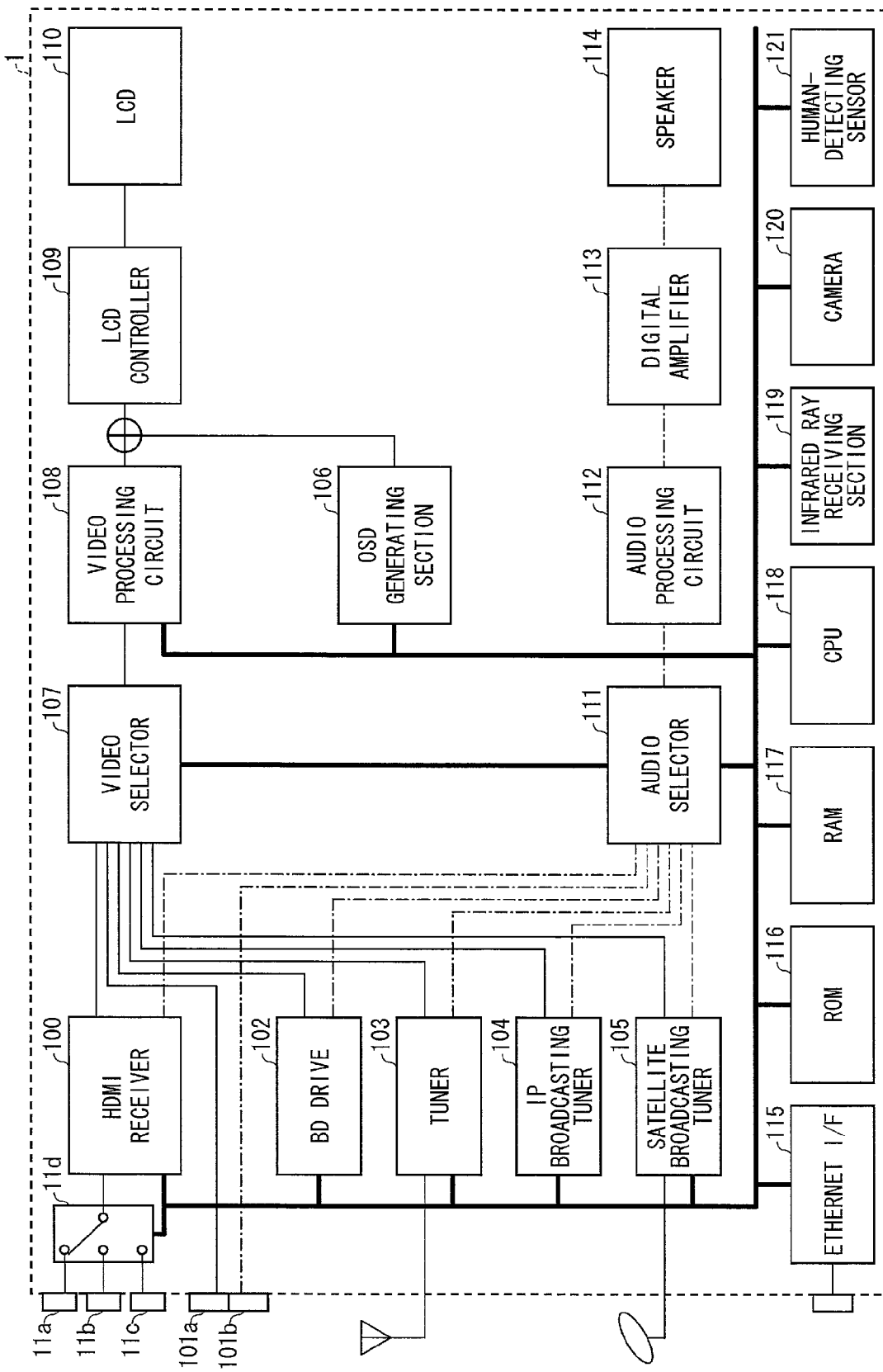
FIG. 4

The following description will discuss a configuration of the TV 1 in accordance with the present embodiment, with reference to FIG. 4. FIG. 4 is a block diagram showing a configuration of the TV 1.

As illustrated in FIG. 4, the TV 1 has three HDMI input terminals 11a through 11c, a video input terminal 101a, and an audio input terminal 101b. The TV 1 includes an HDMI switch 11d, an HDMI receiver 100, a BD drive 102, a tuner 103, an IP broadcasting tuner 104, a satellite broadcasting tuner 105, an OSD generating section 106, a video selector 107, a video processing circuit 108, an LCD controller 109, an LCD (Liquid Crystal Display) 110, an audio selector 111, an audio processing circuit 112, a digital amplifier 113, a speaker 114, Ethernet I/F 115 (Ethernet is Registered Trademark), a ROM 116, a RAM 117, a CPU 118, an infrared ray receiving section 119, a camera 120, and a human-detecting sensor 121. In FIG. 4, paths for video signals are indicated by solid lines, paths for audio signals are indicated by alternate long and short dash lines, and paths for data and control signals are indicated by bold lines.

Supplied to the video selector 107 are (1) a video received by the HDMI receiver 100, (2) a video supplied via the video input terminal 101a, (3) a video read out from a BD (Blu-ray Disc) by the BD drive 102, (4) a video received via the tuner 103, (5) a video received via the IP broadcasting tuner 104, and (6) a video received via the satellite broadcasting tuner 105. Meanwhile, supplied to the audio selector 111 are (1) audio received by the HDMI receiver 100, (2) audio supplied via the audio input terminal 101b, (3) audio read out from a BD by the BD drive 102, (4) audio received via the tuner 103, (5) audio received via an IP broadcasting tuner 104, and (6) audio received via the satellite broadcasting tuner 105.

A CPU 118 controls selections of the following (a) through (d): (a) which one of the HDMI input terminals the HDMI receiver 100 should be connected to, i.e., which one of pieces of content, supplied via the respective HDMI input terminals, should be supplied to the HDMI receiver 100 via the HDMI switch 11d; (b) which one of pieces of content, supplied via respective channels, should be received by the tuner 103; (c) which one of pieces of content, distributed via respective servers, should be received by the IP broadcasting tuner 104; and (d) which one of pieces of content, supplied via respective channels, should be received by the satellite broadcasting tuner 105. The CPU 118 carries out (e) reproduction control, with respect to the BD drive 102, such as playback, stop, fast forward, rewind, and chapter transition.

The video selector 107 selects any one of (1) the video supplied from the HDMI receiver 100, (2) the video supplied via the video input terminal 101a, (3) the video supplied from the BD drive 102, (4) the video supplied from the tuner 103, (5) the video supplied from the IP broadcasting tuner 104, and (6) the video supplied from the satellite broadcasting tuner 105. The video selected by the video selector 107 is supplied to the video processing circuit 108. Note that the CPU 118 controls which one of the videos the video selector 107 should select.

The video processing circuit 108 makes an image quality adjustment of the video supplied from the video selector 107. The video processing circuit 108 also performs scaling with respect to the video supplied from the video selector 107. Note here that the image quality adjustment is indicative of modifying at least one of, for example, brightness, sharpness, and contrast. The scaling is indicative of reducing a size of a video while maintaining a proper aspect ratio of the video to be displayed. The video, which has been subjected to the image quality adjustment and the scaling by the video processing circuit 108, is supplied to the LCD controller 109. Note that the CPU 118 controls how the image quality should be modified by the video processing circuit 108 and to what degree the video should be reduced in size.

The LCD controller 109 controls and drives the LCD 110 to display the video supplied from the video processing circuit 108. As a result, the LCD 110 outputs the video selected by the video selector 107. Note that, in a case where an OSD image is supplied from the OSD generating section 106, the LCD controller 109 controls the LCD 110 to display the OSD image supplied from the OSD generating section 106 so that the OSD image is superimposed on the video supplied from the video processing circuit 108.

The audio selector 111 selects any one of (1) audio supplied from the HDMI receiver 100, (2) audio supplied via the video input terminal 101a, (3) audio supplied from the BD drive 102, (4) audio supplied from the tuner 103, (5) audio supplied from the IP broadcasting tuner 104, and (6) audio supplied from the satellite broadcasting tuner 105. The audio selected by the audio selector 111 is supplied to the audio processing circuit 112. The CPU 118 controls which audio the audio selector 111 selects. Note, however, that the selection of the video by the video selector 107 and the selection of the audio by the audio selector 111 work in communication with each other. For example, when the video selector 107 selects a video supplied from the HDMI receiver 100, the audio selector 111 also selects audio supplied from the HDMI receiver 100.

The audio processing circuit 112 makes a sound volume adjustment of and a sound quality adjustment of the audio supplied from the audio selector 111. The sound quality adjustment is indicative of modifying frequency characteristics (e.g. emphasizing low frequencies and emphasizing high frequencies) of the audio supplied from the audio selector 111. The audio whose sound volume and sound quality have been adjusted by the audio processing circuit 112 is supplied to the digital amplifier 113. Note that the CPU 118 controls how the sound volume and the sound quality should be modified by the audio processing circuit 112.

The digital amplifier 113 drives a speaker 114 so that the speaker 114 outputs the audio supplied from the audio processing circuit 112. As a result, the audio selected by the audio selector 111 is outputted from the speaker 114.

The CPU 118 controls the sections described above in response to a remote controller signal received by an infrared ray receiving section 119, an image captured by a camera 120, and an output signal outputted by the human-detecting sensor 121. An output signal of the human-detecting sensor 121 is a binary signal indicative of whether or not a viewer is present within a sensible range of the human-detecting sensor 121. Examples of control performed with use of the infrared ray receiving section 119 encompass (i) control in which channels selected by the tuner 103 are switched in response to a remote controller signal and (ii) control in which video and audio selected by the video selector 107 and audio selector 111, respectively, are switched in response to a remote controller signal. Examples of control performed with use of the camera 120 encompass control in which how to adjust an image quality is switched, in the video processing circuit 108, in response to a viewer identified on the basis of a captured image. Examples of the control with use of the human-detecting sensor 121 encompass control in which whether to turn ON or turn OFF backlight of the LCD 110 is switched in response to a sensed result of the human-detecting sensor 121.

The CPU 118 realizes a cooperative operation with the mobile phone terminal 2 by, for example, controlling the HDMI receiver 100 to execute a CEC command transmitted from the mobile phone terminal 2 and/or controlling the HDMI receiver 100 to generate a CEC command to be transmitted to the mobile phone terminal 2. The cooperative operation between the TV 1 and the mobile phone terminal 2 with use of the CEC command will be described later in detail with reference to another drawing.

The ROM 116 is a readable but an non-rewritable memory in which fixed data such as programs to be executed by the CPU 118 is stored. This ROM 116 also stores JPEG data and SVG (Scalable Vector Graphics) data referred to by the OSD generating section 106 so as to generate an OSD image. On the other hand, the RAM 117 is a readable and writable memory in which (i) data to be referred to by the CPU 118 so as to calculate and (ii) variable data such as data generated as a result of calculation by the CPU 118 are stored.

Ethernet I/F 115 is an interface for connecting the TV 1 to a network. The foregoing IP broadcasting tuner 104 has access to a server on the Internet via the Ethernet I/F 115.

[Configuration of Mobile Phone Terminal]

Figure 5:
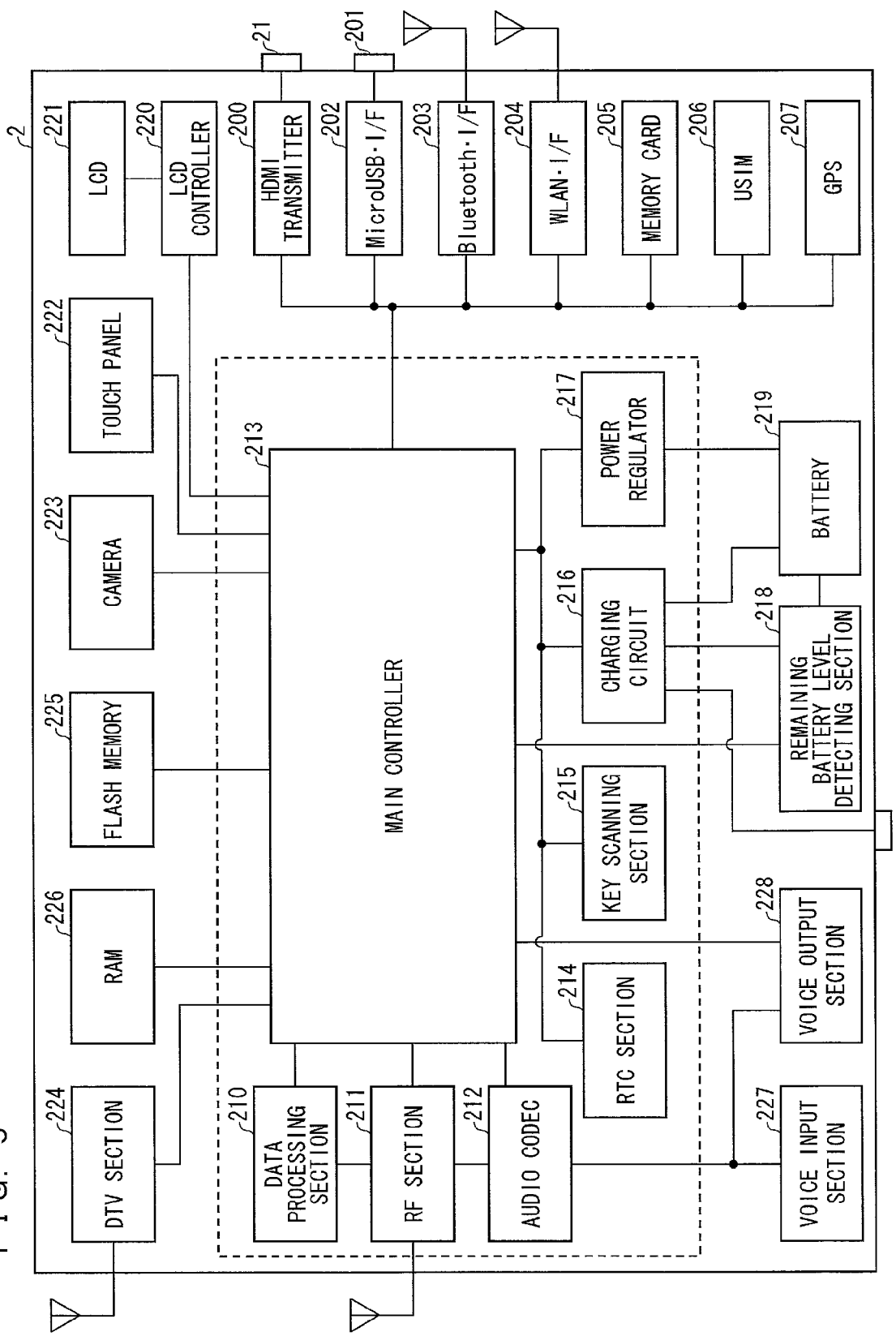
FIG. 5

The following description will discuss a configuration of the mobile phone terminal 2 with reference to FIG. 5. FIG. 5 is a block diagram showing a configuration of the mobile phone terminal 2.

As illustrated in FIG. 5, the mobile phone terminal 2 has an HDMI output terminal 21 and a micro USB terminal 201. The mobile phone terminal 2 includes an HDMI transmitter 200, a micro USB•I/F 202, a Bluetooth•I/F 203, a WLAN (Wireless LAN)•I/F 204, a memory card 205 (detachable), a USIM (Universal Subscriber Identity Module) card 206 (detachable), a GPS (Global positioning system) 207, data processing section 210, an RF section 211, an audio CODEC 212, a main controller 213, an RTC (Real Time Clock) section 214, a key scanning section 215, a charging circuit 216, a power regulator 217, a remaining battery level detecting section 218, a battery 219, an LCD controller 220, an LCD 221, a touch panel 222, a camera 223, a DTV section 224, a FLASH memory 225, a voice input section 227, a voice output section 228, and a RAM 226. In FIG. 5, a block, which is to be mounted on a main substrate together with the main controller 213, is indicated by a dotted line.

The mobile phone terminal 2 has (1) a telephonic communication function realized mainly by the RF section 211 and the audio CODEC section 212, (2) an image capturing function realized mainly by the camera 223, (3) a receiving function of one-segment broadcasting realized mainly by the DTV section 224, (4) an electric power supplying function realized mainly by the battery 219 and the power regulator 217, (5) a charging function realized mainly by the charging circuit 216, the remaining battery level detecting section 218, and the battery 219, (6) a wireless communication function realized mainly by the Bluetooth•I/F 203 or WLAN•I/F 204, (7) a position management function realized mainly by the GPS 207, (8) a time management function realized mainly by the RTC section 214, and (9) a user operation detection function realized mainly by the key scanning section 215 or the touch panel 222. Note, however, that those functions are regular functions of a conventional mobile phone terminal 2. Therefore, their descriptions are omitted here.

The mobile phone terminal 2 has, other than those functions, a content playback function to play back content. The mobile phone terminal 2 is capable of playing back pieces of content such as a still image, a moving image, and audio. The still image, the moving image, or the audio is played back by, for example, decoding still image data (e.g. JPEG data), moving image data (e.g. MPEG data), or audio data (e.g. MP3 data), respectively, each of which is read out by the main controller 213 from the FLASH memory 225. Instead of the FLASH memory 225, the main controller 213 can decode still image data, moving image data, or audio data read out from a USB device connected to a Micro USB terminal or read out from a memory card 205. The content decoded by the main controller 213 is supplied to the HDMI transmitter 200. The HDMI transmitter 200 transmits the content supplied from the main controller 213 to the TV 1 connected via the HDMI cable 3.

The mobile phone terminal 2 has a function to carry out communication applications. Examples of the communication application which can be carried out by the mobile phone terminal 2 encompass (i) a first communication application utilizing a communication of the RF section 211 with a base station and (ii) a second communication application utilizing a short-distance wireless communication of the Bluetooth•I/F 203 or WLAN•I/F 204 (applications using the Internet can be installed as the first communication application or the second communication application). Specific examples of the communication application encompass multipurpose applications, such as an e-mail client and a web browser, and applications exclusively for utilizing various web services. For example, push information service for distributing text data such as news and traffic jam information is an example of such web service.

Furthermore, the main controller 213 realizes a cooperative operation with the TV 1, by controlling the HDMI transmitter 200 to execute a CEC command supplied from the TV 1 and/or by controlling the HDMI transmitter 200 to generate a CEC command to be sent to the TV 1. For example, when the HDMI transmitter 200 receives a <Give Physical Address> command, the main controller 213 controls the HDMI transmitter 200 to transmit a <Report Physical Address> command that contains physical address and logical address (Playback Device) of the main controller 213 as arguments. Moreover, when the HDMI transmitter 200 receives a <Give Device Type> command, the main controller 213 controls the HDMI transmitter 200 to transmit a <Report Device Type> command that contains a device type of the mobile phone terminal 2 (Mobile Phone) as an argument. How the TV 1 works with the mobile phone terminal 2 with use of the CEC command will be described later in detail, with reference to another drawing.

[Details of HDMI Transmitter and HDMI Receiver]

Figure 6:
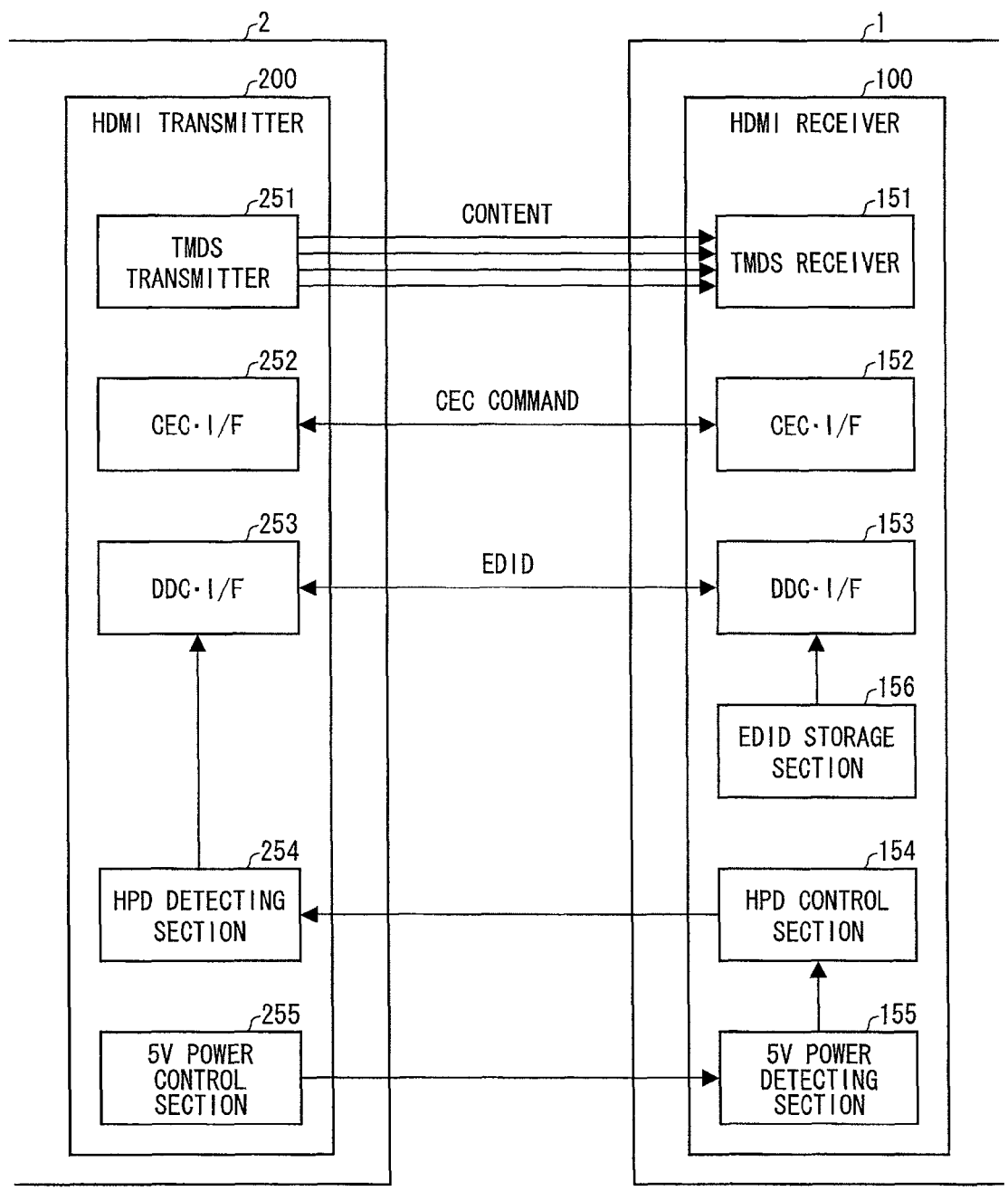
FIG. 6

The following description will further specifically discuss the HDMI receiver 100 provided in the TV 1 and the HDMI transmitter 200 provided in the mobile phone terminal 2, with reference to FIG. 6. FIG. 6 is a block diagram showing a configuration of the HDMI receiver 100 and the HDMI transmitter 200.

The HDMI cable 3 is made up of (i) a TMDS (Transition Minimized Differential Signaling) line for transmitting content (video signals and audio signals), (ii) a CEC line for transmitting a CEC (Consumer Electronics Control) command, (iii) a DDC (Display Data Cannel) line for transmitting EDID (Extended Display Identification Data), (iv) an HPD line for transmitting an HPD (Hot Plug Detect) signal, and (v) a 5V power line whose voltage (an electric potential with respect to a ground potential) is controlled to be 5V by a source device for detecting connection.

The HDMI receiver 100 includes a TMDS receiver 151, a CEC•I/F 152, a DDC•I/F 153, an HPD control section 154, a 5V power detecting section 155, and an EDID storage section 156. Each of the sections included in the HDMI receiver 100 is controlled by the CPU 118.

The TMDS receiver 151 is an interface for receiving content transmitted via the TMDS line in the HDMI cable 3. The content received by the TMDS receiver 151 is supplied to the video selector 107 and the audio selector 111.

The CEC•I/F 152 is an interface for receiving a CEC command transmitted via the CEC line in the HDMI cable 3. The CEC command received by the CEC•I/F 152 is supplied to the CPU 118. Note that the CEC•I/F 152 is an interface for transmitting a CEC command via the CEC line in the HDMI cable 3. The CEC command transmitted by the CEC•I/F 152 is supplied from the CPU 118.

The DDC•I/F 153 is an interface for transmitting EDID through the DDC line in the HDMI cable 3. The EDID that the DDC•I/F 153 transmits is read out from the EDID storage section 156.

The 5V power detecting section 155 monitors a voltage of a 5V power pin to which the 5V power line in the HDMI cable 3 is connected, and detects a rising edge of the voltage. When detecting the voltage of the 5V power pin having risen to 5V, the 5V power detecting section 155 provides the CPU 118 and the HPD control section 154 a notification in which the connection has been established between the HDMI receiver 100 and the HDMI transmitter 200. When the HPD control section 154 receives a notification from the 5V power detection section 155, the HPD control section 154 controls the voltage of the HPD pin connected to the HPD line in the HDMI cable 3 to rise to an H (high) level. After the voltage of the HPD pin connected to the HPD line in the HDMI cable 3 has risen to the H level, the HDMI transmitter 200 retrieves an EDID stored in the EDID storage section 156 of the HDMI receiver 100, via the DDC line.

(Details of HDMI Transmitter 200)

The HDMI transmitter 200 includes a TMDS transmitter 251, a CEC•I/F 252, a DDC•I/F 253, an HPD detecting section 254, and a 5V power control section 255. The main controller 213 controls each of the sections provided in the HDMI transmitter 200.

The TMDS transmitter 251 is an interface for transmitting content via the TMDS line in the HDMI cable 3. The content transmitted by the TMDS transmitter 251 is content that has been decoded by the main controller 213.

The CEC•I/F 252 is an interface for receiving a CEC command transmitted via the CEC line in the HDMI cable 3. The CEC command received by the CEC•I/F 252 is supplied to the main controller 213. Note that the CEC•I/F 252 is an interface for transmitting the CEC command via the CEC line in the HDMI cable 3. The CEC command to be transmitted by the CEC•I/F 252 is supplied from the main controller 213.

The DDC•I/F 253 is an interface for receiving an EDID transmitted via the DDC line in the HDMI cable 3. The EDID received by the DDC•I/F 253 is stored in the RAM 226 via the main controller 213.

The 5V power control section 255 controls the voltage of the 5V power pin connected to the 5V power line in the HDMI cable 3 to be 5V so that the connection between the HDMI receiver 100 and the HDMI transmitter 200 can be detected. The HPD detecting section 254 monitors the voltage of the HPD pin to which the HPD line in the HDMI cable 3 is connected, and detects a rising edge of the voltage. When detecting the voltage of the HPD pin having risen to an H level, the HPD detecting section 254 provides the main controller 213 and the DDC•I/F 253 with a notification in which the connection has been established between the HDMI transmitter 200 and a corresponding sink device. Upon receipt of the notification from the HPD detecting section 254, the DDC•I/F 253 retrieves an EDID stored in the EDID storage section 156 via the DDC•I/F in the HDMI receiver 100.

The CEC command, to be transmitted and received between the devices connected via the HDMI cable, contains, as arguments, a logical address and/or a physical address of a sender and/or a destination. The devices connected via the HDMI cable identify the sender and/or the destination of the CEC command on the basis of the logical address and/or the physical address contained in the CEC command.

In the present embodiment, the logical address is represented by a natural number from 0 through 15, each of which indicates a kind of device (any one of TV, recording device, playback device, tuner, and audio device). For example, a logical address "0" represents a TV, a logical address "1" represents a first recording device, and a logical address "2" represents a second recording device. Note that a correspondence of the logical address to the kind of device is defined as in the following Table. In the present specification, "TV", "Recording Device 1 through 3", "Playback Device 1 through 3", "Tuner 1 through 4", and "Audio System", in the Table below, can also be referred to as "TV", "recording device", "playback device", "tuner", and "audio device", respectively.

TABLE 1

| Logical address | Kind of Device |
| --- | --- |
| 0 | TV |
| 1 | Recording Device 1 |
| 2 | Recording Device 2 |

TABLE 1-continued

| Logical address | Kind of Device |
| --- | --- |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Specific Use |
| 15 | Unregistered |

On the other hand, the physical address is represented by a four-digit natural number indicative of a path from a source device. For example, a physical address (x,0,0,0) is allotted to a source device X connected to a x-th HDMI input terminal of a sink device (TV), and a physical address (x,y,0,0) is allotted to a source device Y connected to a y-th HDMI input terminal of the source device X. In a case of the configuration illustrated in FIG. 4, a physical address (1,0,0,0) is allotted to a source device connected to the HDMI input terminal 11a, and a physical address (2,0,0,0) is allotted to a source device connected to the HDMI input terminal 11b. Note that a physical address (0,0,0,0) is allotted to the TV which is the sink device.

[Functions of Main Controller in Mobile Phone Terminal]

Figure 1:
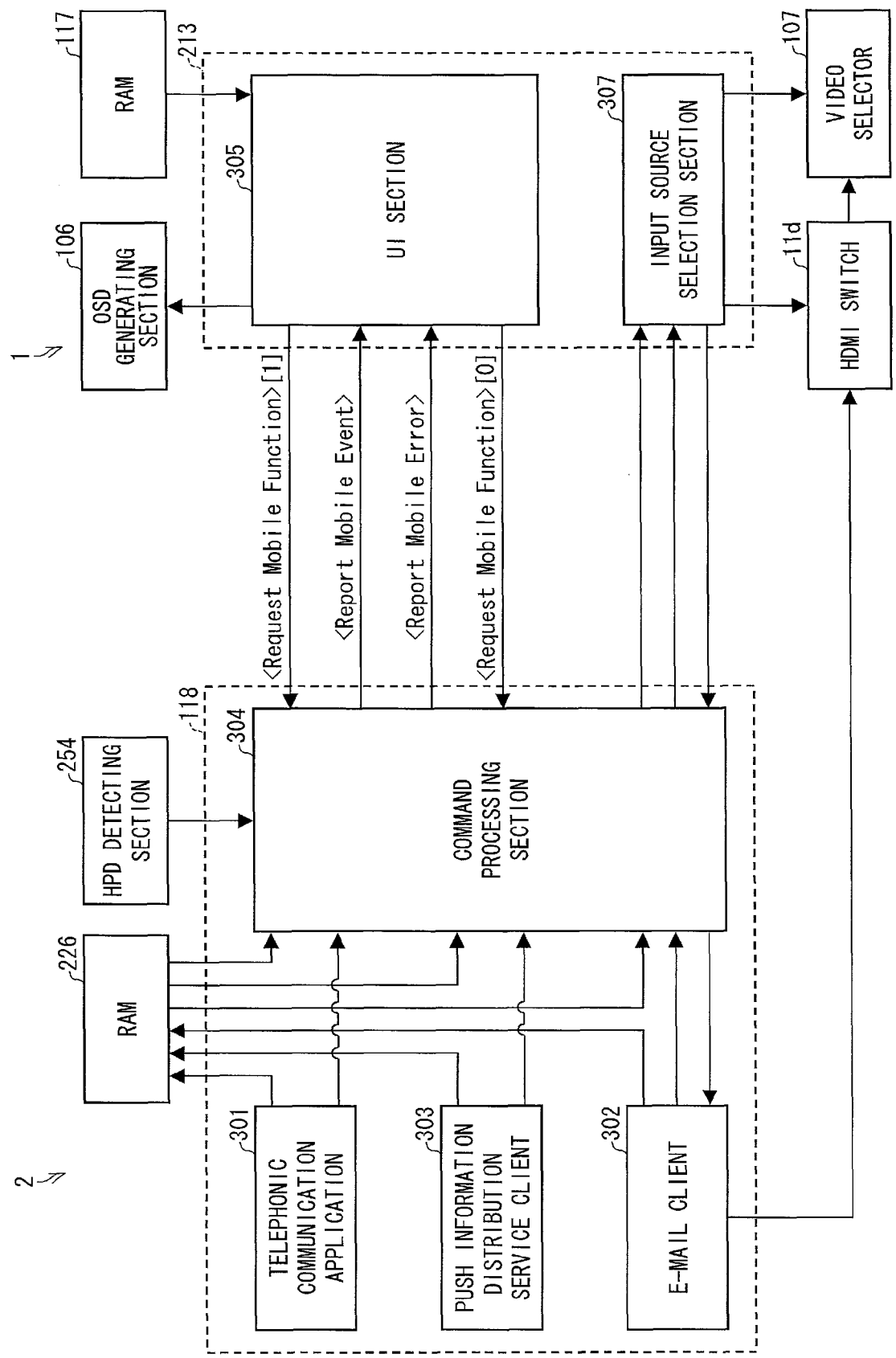
FIG. 1

With reference to FIG. 1, the following description will discuss functions of the main controller 213 in the mobile phone terminal 2, which functions are requested for realizing a cooperative operation between the mobile phone terminal 2 and the TV 1. FIG. 1 is a functional block diagram showing the functions of the main controller 213 of the mobile phone terminal 2 and the functions of the CPU 118 of the TV 1. Note that the block diagram shown in FIG. 1 shows functions, that are inherent to the present invention, out of various functions of the main controller 213 and various functions of the CPU 118. It is needless to say that the main controller 213 and the CPU 118 each can have other functions not illustrated in FIG. 1.

As illustrated in FIG. 1, the main controller 213 of the mobile phone terminal 2 includes a telephonic communication application 301, an e-mail client 302, a push information distribution service client 303, and a command processing section 304.

The telephonic communication application 301 is provided for realizing the telephonic communication function and a videophone function. Upon receipt of a voice phone call, the telephonic communication application 301 starts a calling process and the command processing section 304 with a notification in which the calling process has been started. In a case where the telephonic communication application 301 ends the calling process without starting a telephonic communication process (i.e., in a case where a user does not answer the phone call), the telephonic communication application 301 provides the command processing section 304 with a notification in which the calling process has been ended, and stores, in a RAM 226, a sender's telephone number as an incoming call log. A similar process applies to a case where the telephonic communication application 301 received an videophone call.

The e-mail client 302 is an application for sending/receiving an e-mail. Upon receipt of an e-mail, the e-mail client 302 provides the command processing section 304 with a notification in which the e-mail has been received and stores, in the RAM 226, a sender's mail address as an incoming e-mail log.

Upon receipt of text data (hereinafter, referred to as "push information") distributed from a push information distribution server, the push information distribution service client 303 provides the command processing section 304 with a notification in which the push information has been received and stores, in the RAM 226, the push information thus received.

The command processing section 304 is means for issuing a command for causing the TV 1 to display a status of the mobile phone terminal 2. Specifically, the command processing section 304 operates as follows.

In a case where the command processing section 304 has been provided, by the telephonic communication application 301, with a notification in which a calling process has been started, the command processing section 304 determines that a transition to a "voice phone call receiving status" has occurred in the mobile phone terminal 2, and then issues, to the TV 1 via the CEC•I/F 252, a <Report Mobile Event> command including an event ID=5 which corresponds to the "voice phone call receiving status". In a case where the command processing section 304 has been provided, by the telephonic communication application 301, with a notification in which the calling process has been ended, the command processing section 304 determines that a transition to a "non voice-phone-call receiving status" has occurred in the mobile phone terminal 2, and then issues, to the TV 1 via the CEC•I/F 252, a command for causing the TV 1 to clear display of the "voice phone call receiving status".

Note that the <Report Mobile Event> command is a command for causing the TV 1 to display a status of the mobile phone terminal 2. In the present embodiment, the <Report Mobile Event> command is used (i) to cause the TV 1 to clear the display of the "voice phone call receiving status", and (ii) to transmit push information to the TV 1 as later described. Note also that details of the <Report Mobile Event> command will be described later with reference to another drawing.

Upon receipt of a notification in which an e-mail has been received from the e-mail client 302, the command processing section 304 determines that a transition to a status of "You have got a new e-mail" has occurred in a status of the mobile phone terminal 2, and then issues, to the CEC•I/F 252 via the TV 1, a <Report Mobile Event> command including an event ID=9 which corresponds to the status of "You have got a new e-mail".

In a case where the command processing section 304 has acquired push information from the push information distribution service client 303, the command processing section 304 transmits the push information thus acquired to the TV 1 via the CEC•I/F 252. As described above, the <Report Mobile Event> command is used, in the present embodiment, to transmit the push information to the TV 1.

In a case where an establishment of connection between the mobile phone terminal 2 and TV 1 is detected by the HPD detecting section 254, the command processing section 304 causes the TV 1 to display a status of the mobile phone terminal 2 with use of a <Report Mobile Event> command. Upon receipt of a request (Request Mobile Function command, which will be later described in detail) from the TV 1, the command processing section 304 causes the TV 1 to display a status of the mobile phone terminal 2 with use of a <Report Mobile Event> command. The status which the command processing section 304 causes the TV 1 to display is, in any case, a status designated on the basis of the number of unattended incoming call logs and the number of incoming e-mail logs stored in the RAM 226 (i.e., a status expressible as "the number of new e-mail(s) is A, and the number of unattended incoming call(s) is B"). Note that, in order to designate the status expressed as "the number of new e-mail(s) is A, the number of incoming call(s) is B", not only a corresponding event ID=4, but also two parameters A and B are necessary.

Note that, in a case where (i) the HPD detecting section 254 has detected the establishment of connection between the mobile phone terminal 2 and the TV 1 or (ii) the command processing section 304 has received the request (Request Mobile Function command) from the TV 1, a status which the command processing section 304 causes the TV 1 to display is not limited to the status designated on the basis of the number of incoming call logs and the number of incoming e-mail logs. Instead, the TV 1 can display, for example, a status designated on the basis of whether or not there is an incoming voice phone or an incoming videophone call log or a status designated on the basis of whether or not there is an incoming e-mail log (a status expressible as "You have got an unattended incoming call" or "You have got a new e-mail").

A relationship, between statuses of the mobile phone terminal 2 and respective events ID which are contained in a <Report Mobile Event> command by the mobile phone terminal 2, is listed below (see Table 2).

TABLE 2

| Status of Mobile Phone Terminal | Event ID |
| --- | --- |
| The number of new e-mail(s) is A, the number of unattended incoming call(s) is B | 4 |
| Voice phone call receiving | 5 |
| Unattended incoming voice phone call(s) | 6 |
| Videophone call receiving | 7 |
| Unattended incoming videophone call(s) | 8 |
| Receiving e-mail | 9 |

FIG. 7 is a view illustrating a data structure of a <Report Mobile Event> command. The <Report Mobile Event> command contains an argument in which a format ID ("Format_ID" in FIG. 7), priority order designation information ("Priority Order" in FIG. 7), guide display designation information ("Presence/Absence of Guide Display" in FIG. 7), an event ID, display time period designation information ("Display Time Period" in FIG. 7), display location designation information ("Display Location" in FIG. 7), an icon ID, a sound effect ID, text color designation information ("Text Color" in FIG. 7), background color designation information ("Background Color" in FIG. 7), a parameter 1 ("Parameter1" in FIG. 7), and a parameter 2 ("Parameter 2" in FIG. 7) are connected with one another.

The format ID shows a data structure of arguments following the format ID. For example, a format ID "0000" indicates that priority order designation information, guide display designation information, and an event ID follow the format ID in this order. Similarly, a format ID "0001" indicates that priority order designation information, guide display designation information, event ID, and a parameter 1 follow the format ID in this order.

Priority order designation information is information that designates which <Report Mobile Event> command the TV 1 should be preferentially executed (which status designated on the basis of an event ID contained in a <Report Mobile Event> command should be preferentially displayed). Priority order designation information is expressed by a value from 0 through 15. In a case where a <Report Mobile Event> command has a highest priority, a value of priority order designation information is set to 0 (zero). Meanwhile, in a case where a <Report Mobile Event> command has a lowest priority, a value of priority order designation information is set to 15.

An event ID is information which designates a status of the mobile phone terminal 2. Examples of a status, which can be designated on the basis of an event ID, encompass the statuses of Table 2 (shown above). In Table 2, "Voice phone call receiving" indicates a status in which a calling process is being carried out after a voice phone call is received, and "Unattended incoming voice phone call(s)" indicates a status in which an incoming voice phone call log(s) which has been canceled without telephonic communication is stored. "Videophone call receiving" indicates a status in which a calling process is being carried out after a videophone call is received, and "Unattended incoming videophone call(s)" indicates a status in which an incoming videophone call log(s) which has been canceled without telephonic communication is stored. "You have got new e-mail(s)" indicates a status in which an incoming e-mail(s) which has not been read yet is stored. "the number of new e-mail(s) is A, the number of unattended incoming call(s) is B" indicates a status in which A received new e-mail(s) which has not been read yet is stored and B incoming voice phone call log(s) which has been canceled before telephonic communication started is stored.

Guide display designation information is information which designates whether to cause the TV 1 to display (i) an operation guide teaching how to operate the TV 1 and (ii) a status of the mobile phone terminal 2. Guide display designation information has a value of 0 or 1. In a case where it is designated that the TV 1 is caused not to display the operation guide, a value of guide display designation information is set to 0, whereas in a case where it is designated that the TV 1 is caused to display the operation guide, a value of guide display designation information is set to 1.

Display time period designation information is information which designates a display time period in which the TV 1 is caused to display a status of the mobile phone terminal 2. Specifically, the display time period designation information designates how many times of a predetermined unit time corresponds to the display time period. In a case where no display time period designation information is designated, the TV 1 is caused to display a status of the mobile phone terminal 2 for a display time period which is twice as long as the predetermined unit time. Display location designation information is information which designates a location where the TV 1 is caused to display a status of the mobile phone terminal 2. Specifically, the display location designation information designates one of predetermined display locations (here, a lower right corner, an upper right corner, a lower left corner, an upper left, or a center of a display). In a case where no display location designation information is designated, the TV 1 is caused to display a status of the mobile phone terminal 2 at the lower right corner on the display. Alternatively, display location designation information can designate a location on the display other than the lower right corner, the upper right corner, the lower left corner, the upper left, and the center. For example, display location designation information can designate a location such that a status of the mobile phone terminal 2 is displayed in a channel call region on the display.

An icon ID (icon designation information) is information which designates an icon which the TV 1 is caused to display together with a status of the mobile phone terminal 2. In a case where no icon ID is designated, the TV 1 is caused to display no icon. A sound effect ID (sound effect designation information) is information which designates a sound effect which the TV 1 is caused to output together with a status of the mobile phone terminal 2. In a case where no sound effect ID is designated, the TV 1 outputs no sound effect.

Text color designation information is information which designates a text color of text indicative of a status of the mobile phone terminal 2. In a case where no text color designation information is designated, the TV 1 is caused to display text indicative of a status of the mobile phone terminal 2 with a predetermined default text color (e.g., black). Background color designation information is information which designates a background color of text indicative of a status of the mobile phone terminal 2. In a case where no background color designation information is designated, the TV 1 is caused to display text indicative of a status of the mobile phone terminal 2 on a predetermined default background color (e.g., white).

Note that values of respective parameters contained in a <Report Mobile Event> command are set, for example, as follows (see Table 3) in accordance with an event ID contained in the <Report Mobile Event> command.

TABLE 3

| Event ID | Format_ID | Priority Order | Guide Display | Display Time Period | Display Location | Icon ID | Sound Effect ID | Text color | Background Color |
|---|---|---|---|---|---|---|---|---|---|
| 4 | 5 | 3 | 0 | 2 | 0 | 1 | 1 | 2 | 2 |
| 5 | 3 | 0 | 0 | 2 | 0 | 1 | 1 | 2 | 2 |
| 6 | 3 | 1 | 1 | 2 | 0 | 1 | 1 | 2 | 2 |
| 7 | 3 | 0 | 0 | 2 | 0 | 1 | 1 | 2 | 2 |
| 8 | 3 | 1 | 0 | 2 | 0 | 1 | 1 | 2 | 2 |
| 9 | 3 | 2 | 1 | 2 | 0 | 1 | 1 | 2 | 2 |

Note, in the present embodiment, that a <Report Mobile Event> command, in which a format ID is set to "1100", is used to transmit a character string of 8 bytes from the mobile phone terminal 2 to the TV 1 (FIG. 7).

Note, in the present embodiment, that a <Report Mobile Event> command, in which a format ID is set to "0000" and an event ID is set to 0, is used so as to clear a status display of the mobile phone terminal 2 on the display of to the TV 1. Furthermore, a command, in which a format ID is set to "0000" and an event ID is set to 1, is used to clear a character string buffer of the TV 1.

Furthermore, in the present embodiment, a <Report Mobile Event>command, in which a format ID is set to "1100" and an event ID is set to 2, is used so as to transmit a character string (corresponding to 8 bytes) from the mobile phone terminal 2 to the TV 1. By using a <Report Mobile Event>command N times, it is possible to transmit a character string of 8×N in a division manner. The character strings thus transmitted are stored in a character string buffer in association with pieces of character string order designation information ("character string order" in FIG. 7) contained in respective <Report Mobile Event>commands. Furthermore, a <Report Mobile Event>command, in which a format ID is set to "0000" and an event ID is set to 3, is used so as to instruct the TV 1 to start displaying of a character string. Upon receipt of the <Report Mobile Event>command, the TV 1 restores an original character string by connecting the character strings stored in the character string buffer in an order designated by the respective pieces of character string order designation information, and then starts to display the character strings thus restored. By employing such a structure, it is possible to transmit a character string to the TV 1 with use of a CEC command, even if the character string is a long character string, such as news, delivered from a push information distribution service.

[Function which CPU of Television has]

Going back to FIG. 1, a CPU of the TV 1 will be described below. The CPU 118 of the TV 1 also functions as a UI section 305 and an input source selection section 307.

The UI section 305 is configured to carry out on-screen display (OSD) with respect to a text corresponding to a <Report Mobile Event> command issued by the mobile phone terminal 2. The UI section 305 determines, while referring to a table stored in the RAM 117, a text to be subjected to the OSD. Event IDs contained in respective <Report Mobile Event> commands and texts to be subjected to the OSD in accordance with the <Report Mobile Event> command are stored in the table while being associated with each other. The UI section 305 can arrive at a text to be subjected to the OSD on the basis of an event ID contained in a <Report Mobile Event> command. The following is an example of such table.

TABLE 4

| Event ID | Processing of Television |
|---|---|
| 4 | To display "the number of new e-mail(s) is A, the number of unattended incoming call(s) is B" on a screen. A is a value designated with use of Parameter 1, and B is a value designated with use of Parameter 2. |
| 5 | To display "Incoming voice phone call is being received" on a screen. |
| 6 | To display "Unattended incoming voice phone call(s)" on a screen. |
| 7 | To display "Incoming videophone call is being received" on a screen. |
| 8 | To display "Unattended incoming videophone call(s)" on a screen. |
| 9 | To display "E-mail(s) is(are) received" on a screen. |

In accordance with display time period designation information and display location designation information contained in a <Report Mobile Event> command, the UI section 305 sets a display time period and a display location at and in which the text, which has been derived from the table, is subjected to the OSD. Note that, in a case where the UI section 305 receives, from the mobile phone terminal 2, two <Report Mobile Event> commands which contain identical display time periods and identical display locations, which one of texts should be displayed is determined by comparing pieces of priority order designation information contained in the respective two <Report Mobile Event> commands.

The UI section 305 sets an icon to be displayed together with a text derived from the table on the basis of an icon ID, and sets a sound effect which is to be made concurrently with the text, derived from the table on the basis of a sound effect ID, being displayed. Furthermore, the UI section 305 sets, based on text color designation information, a text color which is used when displaying the text derived from the table, and sets, based on background color designation information, a background color of the text derived from the table.

Note that, in the present embodiment, a timing for causing the UI section 305 to start an OSD of a text based on an event ID immediately is set to come just after the UI section 305 receives a <Report Mobile Event> command containing the event ID. The present invention is, however, not limited to such a timing. For example, the UI section 305 can be configured so that such a timing is delayed up to a CM (commercial) start timing. This makes it possible to carry out an OSD of a status of the mobile phone terminal 2 without interrupting a TV program other than CMs.

[Report Mobile Error Command]

The following description will discuss a Report Mobile Error command issued by the command processing section 304 of the mobile phone terminal 2.

In a case where an error occurs in the mobile phone terminal 2, the command processing section 304 of the mobile phone terminal 2 issues a command for causing the TV 1 to display a message that the error has occurred. The command processing section 304 transmits, to the UI section 305 of the TV 1, a command (error notification command) containing an error ID (status designation information) for designating a status of the error that has thus occurred. Note that, in the present embodiment, a <Report Mobile Error> command, which is a new bender command disclosed in the present application, is used as the error notification command.

The UI section 305 of the TV 1 reads out, from the RAM 117 of the TV 1, processing content which is associated with an error ID contained in the error notification command thus received. The following table shows example processing contents of the TV 1, stored in the RAM 117 of the TV 1, which are associated with respective error IDs.

TABLE 5

| Error ID | Processing content of TV | Remarks |
| --- | --- | --- |
| 0 | To display on a screen "TV 1 does not support this function.". | In a case where a mobile phone terminal receives, for example, a button of an unsupported panel, the mobile phone terminal sends the error ID 0. |
| 1 | To display on a screen "You cannot use your mobile phone now. Please check a screen of your mobile phone." | In a case where a mobile phone terminal cannot perform an output relating to HDMI (such as receiving of a voice phone call), the mobile phone terminal sends the error ID 1. |

[Request Mobile Function Command]

The description will discuss a Request Mobile Function command issued by the UI section 305 of the TV 1.

The command processing section 304 acquires a <Request Mobile Function> command from the TV 1, and instructs sections to carry out respective processes designated by a request ID (process designation information) contained in the <Request Mobile Function> command thus acquired.

The following table shows (A) example processing contents of the mobile phone terminal 2 and (B) example contents of <Request Mobile Function> commands sent from the TV 1. The example processing contents of (A) are associated with respective request IDs, and the example contents of (B) are associated with the respective request IDs.

TABLE 6

| Request ID | Processing content of mobile phone terminal | Content of request command |
| --- | --- | --- |
| 0 | To transmit the numbers of missed phone calls and new mails to TV. (To provide TV with a notification of an event whose event ID is 4.) | Detailed display of incoming call information |
| 1 | In response to the request 1, a mobile phone terminal requests TV to switch an input of TV and to output a mail screen to TV. | Detailed display of Incoming e-mail(s) |

In a case where a request ID contained in a <Request Mobile Function> command sent from the TV 1 is "1", a requested process is to display contents of an incoming e-mail. The mobile phone terminal 2 causes the TV 1 to display an incoming e-mail screen for displaying the contents of the incoming e-mail. That is, the command processing section 304 instructs the e-mail client 302 to generate the incoming e-mail screen in which an incoming e-mail screen displayed by the mobile phone terminal 2 is subjected to scaling in accordance with a screen size of the TV 1. A video signal, representing the incoming e-mail screen generated by the e-mail client 302, is transmitted from the TMDS transmitter 251 to the TV 1.

That is, the contents of the incoming e-mail is transmitted in a form of a video signal from the TMDS transmitter 251 to the TV 1. The TMDS transmitter 251 has a broadband line. Using the broadband line can cause the TV 1 to quickly display the contents of the incoming e-mail even in a case where the incoming e-mail has a large amount of contents. Meanwhile, the broadband line is provided for transmitting content (video, voice, etc.). In order to use the broadband line to meet such intended purpose, the e-mail client 302 generates, based on contents of an incoming e-mail, a video signal representing an incoming e-mail screen.

FIG. 8 is views illustrating example incoming e-mail screens. (a) and (b) of FIG. 8 illustrate an example incoming e-mail screen which is displayed by the LCD 221 of the mobile phone terminal 2. (c) of FIG. 8 is an example incoming e-mail screen which is displayed by the LCD 110 of the TV 1. The e-mail client 302 carries out scaling with respect to an incoming e-mail screen, to be displayed by the mobile phone terminal 2, such as those illustrated in (a) and (b) of FIG. 8, in accordance with a screen size of the TV 1. This makes it possible to cause the TV 1 to display the incoming e-mail screen.

After instructing the e-mail client 302 to generate the incoming e-mail screen, the command processing section 304 requests the TV 1, which serves as a sink device and is connected to the mobile phone terminal 2 via HDMI, to switch an input source into the mobile phone terminal 2. Such a request is made with respect to the sink device, via a CEC command which is transmitted from a CEC•I/F 252. In the present embodiment, an <Active Source> command is employed as a CEC command which requests the switching of the input source.

Upon receipt of the <Active Source> command from the mobile phone terminal 2, the input source selection section 307 (i) switches the input source into the source device (the mobile phone terminal 2 in the present embodiment) designated by physical address contained in the <Active Source> command and (ii) transmits a <Set Stream Path> command, which contains the physical address as an argument, to each of the source devices connected to the TV 1. In the present embodiment, to switch the input source into a source device designated by the physical address (x, y, z, w) intends to mean to control the HDMI switch 11d to connect the x-th HDMI input terminal to the HDMI receiver 100. After that, the input source selection section 307 transmits to the source device the <Set Stream Path> command and instructs intervening devices, between the TV 1 and the source device that has transmitted the <Active Source> command, to switch the input source so that a path is secured between the TV 1 and the source device. This makes it possible for the TV 1 to surely display the incoming e-mail screen generated by the e-mail client 302.

In a case where a request ID contained in a <Request Mobile Function> command sent from the TV 1 is "0", it is requested to display an incoming phone call log(s) and an incoming e-mail log(s). The mobile phone terminal 2 causes the TV 1 to display the number of unattended incoming phone calls (incoming phone call log(s)) and the number of new e-mails (incoming e-mail log(s)). That is, the command processing section 304 acquires the number of unattended incoming phone calls and the number of new e-mails all of which are stored in the RAM 226. The mobile phone terminal 2 instructs the command processing section 304 to issue a <Report Mobile Event> command containing the number of unattended incoming phone calls and the number of new e-mails thus acquired. The command processing section 304 reads out from the RAM 226 an event ID which is set for indicating the number of unattended incoming phone calls and the number of new e-mails, and then issues a <Report Mobile Event> command containing the event ID, the number of unattended incoming phone calls, and the number of new e-mails. This makes it possible to cause the TV 1 to display the number of unattended incoming phone calls and the number of new e-mails.

Note that (i) request IDs and (ii) processing contents of and request contents of the mobile phone terminal 2 which are associated with the request IDs, are not limited to those listed in Table 6.

Figure 9:
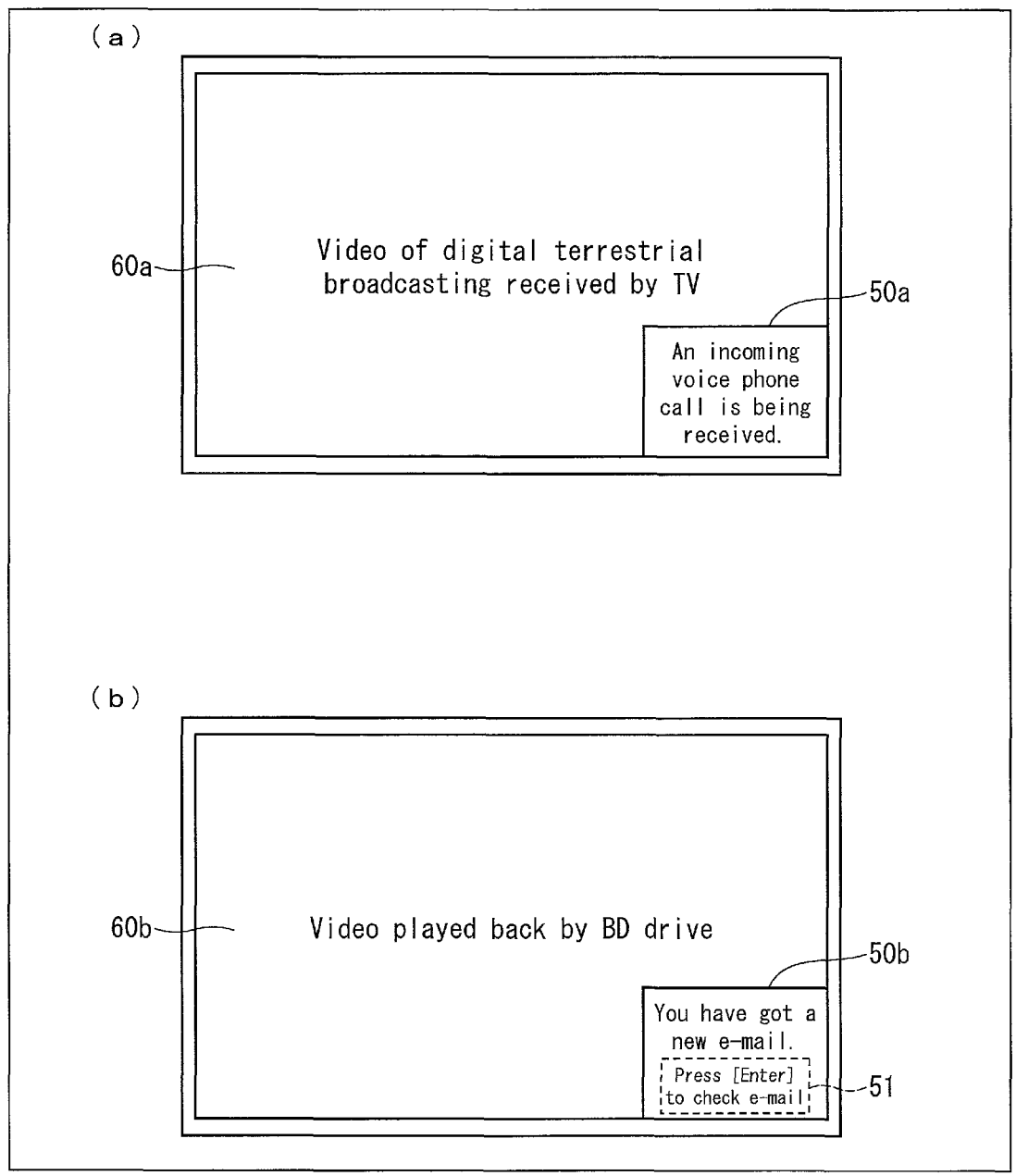
FIG. 9

FIG. 9 is a view illustrating an example configuration of a display screen (a screen displayed by the LCD 110 of the TV 1) containing an event screen. (a) of FIG. 9 is an example display, on a display screen, illustrated in a case where the mobile phone terminal 2 receives a voice phone call. In this example, the TV 1 (i) displays a video 60a of digital terrestrial broadcasting that the TV 1 receives and (ii) carries out an OSD of an event screen 50a which is generated by an instruction of the UI section 305 and indicates an event which is in the process of receiving a voice phone call. (b) of FIG. 9 is an example display, on a display screen, illustrated in a case where the mobile phone terminal 2 has received an e-mail. In this example, the TV 1 (i) displays a video 60b which is being played back by a BD drive 102 and (ii) carries out an OSD of an event screen 50b which is generated by an instruction of the UI section 305 and indicates an event of an e-mail having been received. Furthermore, a guide display 51 is displayed on the event screen 50b. A user can request a process of a request content, such as the contents illustrated in Table 6, by operating the TV 1 in accordance with guide.

Note here that the video of digital terrestrial broadcasting and the video played back by the BD drive have been exemplified as a configuration in which the event screen 50a and the event screen 50b are subjected to the OSD, respectively, by the TV 1. However, the present invention is not limited to them. Examples of the video encompass (1) a video supplied via the HDMI receiver 100, (2) a video supplied via the video input terminal 101a, (3) a video supplied from the BD drive 102, (4) a video supplied from the tuner 103, (5) a video supplied from the IP broadcasting tuner 104, and (6) a video supplied from the satellite tuner 105. That is, the TV 1 can carry out OSD of an event screen, irrespective of videos displayed by the TV 1.

(Specific Example of Command Issue Process)

The following description will discuss, with reference to FIG. 10 through FIG. 13, a specific example of a command issue process, which is carried out by the mobile phone terminal 2 in a case where an HDMI connection is established between the mobile phone terminal 2 and the TV 1. Note that necessary information for causing the TV 1 to display (A) an event ID contained in a <Report Mobile Event> command for use in the present embodiment described above and (B) a status of the mobile phone terminal 2 which is associated with the event ID is expressed with use of only the event ID, and the event ID is enclosed in square brackets ([ ]). Further, a request ID contained in a <Request Mobile Function> command and an error ID contained in a <Report Mobile Error> command are similarly enclosed in square brackets ([ ]).

FIG. 10 is a flowchart showing a flow of a command issue process which is carried out by the mobile phone terminal 2 in a case where the mobile phone terminal 2 receives a voice phone call. Steps of the flowchart illustrated in FIG. 10 will be sequentially described below.

Step S11: upon receipt of a voice phone call, the telephonic communication application 301 provides the command processing section 304 with a notification in which a voice phone call is being received (in the calling process). The command processing section 304 issues, to the TV 1, a command <Report Mobile Event> [5] containing an event ID indicating that the voice phone call is being received.

Steps S12 and S13: during the calling process, the telephonic communication application 301 repeatedly provides the command processing section 304 with the notification in which the voice phone call is being received every m second(s) (m is a natural number). Note that the m second(s) is set to be shorter than a display time period (n seconds) contained in the <Report Mobile Event> [5] (m<n). This is because the TV 1 keeps displaying the event screen while the mobile phone is receiving the voice phone call. When the command processing section 304 is provided with the notification, in which the mobile phone is in the process of receiving the voice phone call, by the telephonic communication application 301, the command processing section 304 issues the <Report Mobile Event> [5] to the TV 1 again.

Step S14: when the calling process ends, the telephonic communication application 301 provides the command processing section 304 with a notification in which the calling process has ended. The command processing section 304 issues, to the TV 1, a command <Report Mobile Event> [0] containing an event ID indicating that the voice phone call has ended.

Steps S15 and S16: the telephonic communication application 301 determines whether or not the voice phone call is an unattended incoming phone call. In a case where the voice phone call is not an unattended incoming phone call, the command issue process ends. In a case where the voice phone call ends without establishing telephonic communication, the incoming voice phone call is an unattended incoming phone call. In this case, the telephonic communication application 301 provides the command processing section 304 with a notification in which the incoming phone call is an unattended incoming phone call.

The command processing section 304 issues, to the TV 1, a command <Report Mobile Event> [6] containing an event ID indicating that the unattended incoming phone call has been generated.

Steps S17 and S18: upon receipt, from the TV 1, a request command <Request Mobile Function> [0] for requesting display of detailed information on the incoming call, the command processing section 304 acquires the number of unattended incoming phone calls and the number of new e-mails from the RAM 226, and the mobile phone terminal 2 instructs the command processing section 304 to issue a <Report Mobile Event> command containing the number of unattended incoming phone calls and the number of new e-mails thus acquired. The command processing section 304 acquires an event ID which is set for indicating the number of unattended incoming phone calls and the number of new e-mails from the RAM 226, and issues, to the TV 1, a command <Request Mobile Function> [4] containing the event ID, the number of unattended incoming phone calls and the number of new e-mails.

FIG. 11 is a sequence diagram showing an example of how a command issue process is carried out when an HDMI connection is established between the mobile phone terminal 2 and the TV 1 and the mobile phone terminal 2 receives an incoming voice phone call. As shown in FIG. 11, in a case where the mobile phone terminal 2 receives an incoming voice phone call, the mobile phone terminal 2 transmits a <Report Mobile Event> [5] so that the TV 1 keeps displaying an event screen while the mobile phone terminal 2 is receiving the incoming voice phone call. When the mobile phone terminal 2 has finished receiving the incoming voice phone call, the mobile phone terminal 2 transmits a command <Report Mobile Event> [0] to the TV 1. Upon receipt of the command <Report Mobile Event> [0], the TV 1 finishes displaying the event screen. In a case where (i) the TV 1 displays an event screen indicative of an unattended incoming phone call(s) and (ii) the mobile phone terminal 2 has received a request for displaying detailed information on the incoming call through a user operation, the command processing section 304 transmits, to the TV 1, a command <Request Mobile Function> [4]. The command <Request Mobile Function> [4] contains (i) an event ID which is set for indicating the number of unattended incoming phone calls and the number of new e-mails, (ii) the number of unattended incoming phone calls, and (iii) the number of new e-mails. This allows the mobile phone terminal 2 to cause the TV 1 to display the number of unattended incoming phone calls and the number of new e-mails on a event screen.

Figure 12:
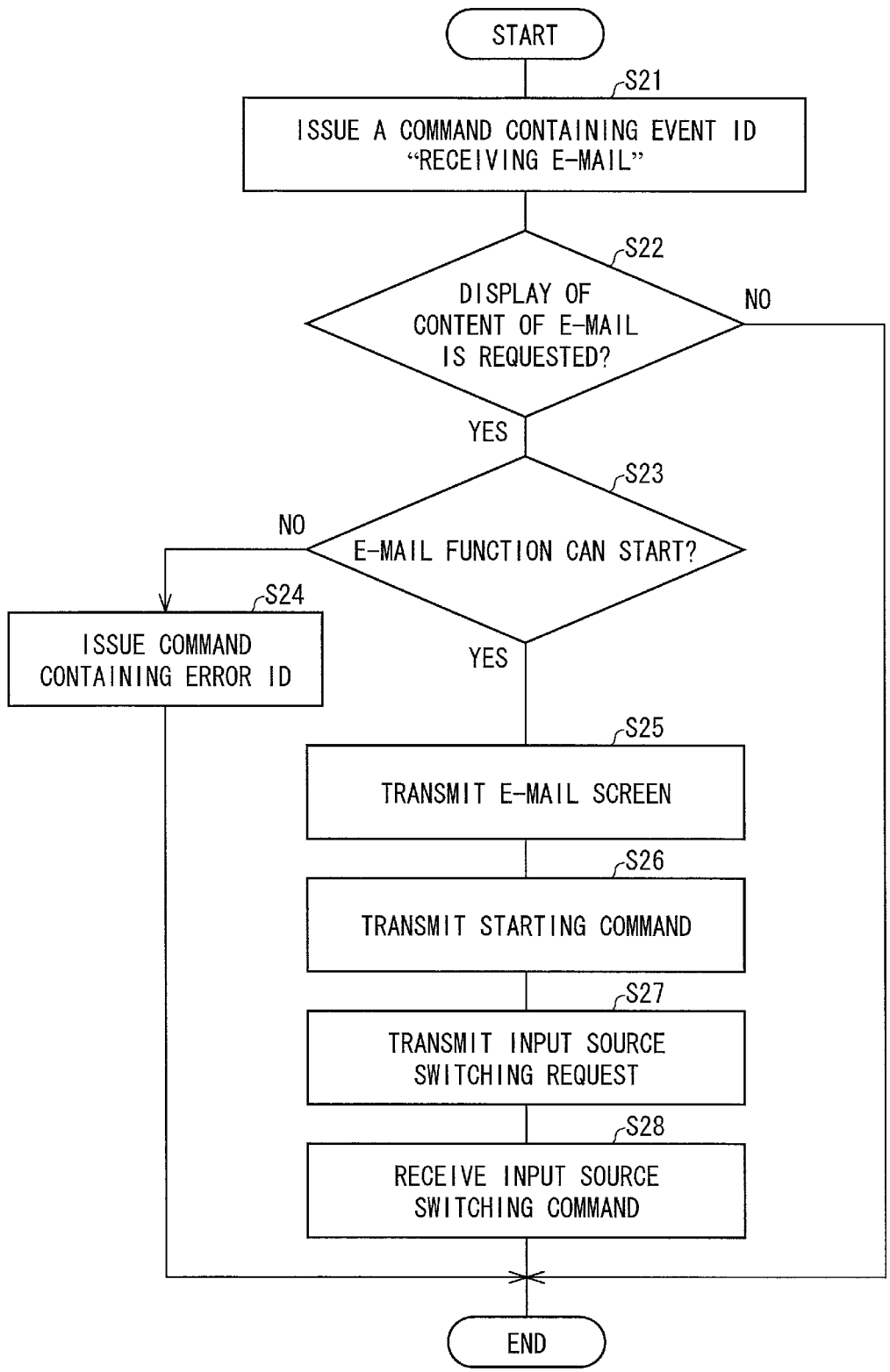
FIG. 12

FIG. 12 is a flowchart showing a flow of how a command issue process is carried out in the mobile phone terminal 2 when the mobile phone terminal 2 receives an e-mail. Steps of the flowchart illustrated in FIG. 12 will be sequentially described below.

Step S21: upon receipt of an e-mail, the e-mail client 302 provides the command processing section 304 with a notification in which the mobile phone terminal 2 has received the e-mail. The command processing section 304 issues, to the TV 1, a command <Report Mobile Event> [9] containing an event ID indicating that the mobile phone terminal 2 has received the e-mail.

Steps S22 through S24: in a case where the command processing section 304 has received, from the TV 1, a command <Request Mobile Function> [1] for requesting to display detailed information on an incoming e-mail, the command processing section 304 causes an e-mail client, which is an e-mail function, to display an incoming e-mail screen. In a case where the e-mail client does not respond to this, the command processing section 304 issues, to the TV 1, an error notification command <Report Mobile Error> [1] for causing an error, indicating that a function of displaying incoming e-mails cannot be used, to be displayed.

Step S25: the e-mail client 302 carries out scaling of the incoming e-mail screen to be displayed by the mobile phone terminal 2 so as to generate an incoming e-mail screen to be displayed by the TV 1. Then, a video signal representing the incoming e-mail screen thus generated is sent from the TMDS transmitter 251 to the TV 1.

Step S26: the command processing section 304 transmits, to the TV 1, <Text View On> serving as a starting command.

Step S27: the command processing section 304 transmits, to TV 1, an <Active Source> command serving as an input source switching request command.

Step S28: the command processing section 304 receives a <Set Stream Path> serving as an input source switching instruction command. This makes it possible to switch an input of the TV 1 into the mobile phone terminal 2.

Figure 13:
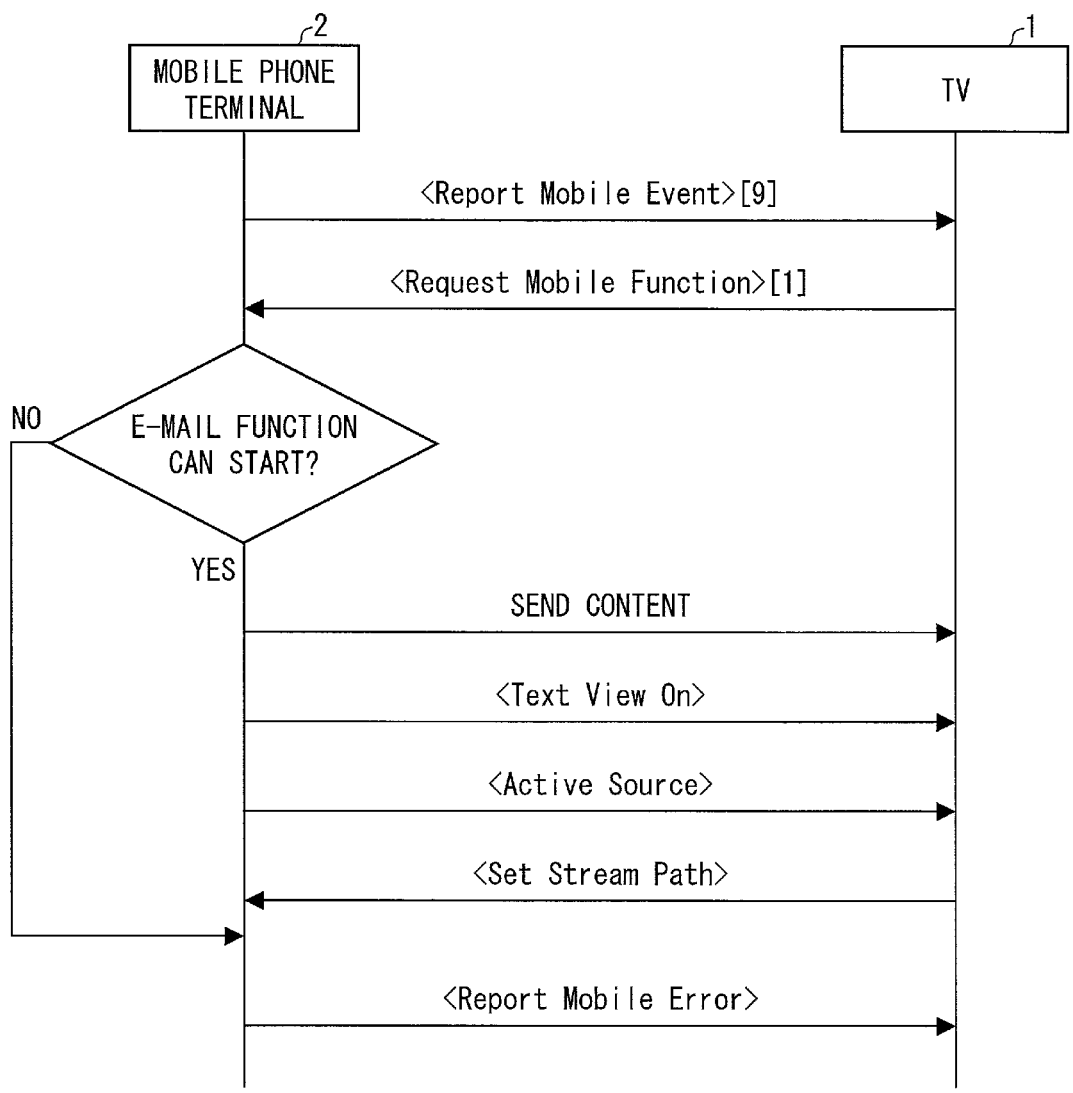
FIG. 13

FIG. 13 is a sequence diagram showing an example of how a command issue process is carried out when the HDMI connection is established between the mobile phone terminal 2 and the TV 1 and the mobile phone terminal 2 receives an incoming e-mail. As shown in FIG. 13, in a case where the mobile phone terminal 2 receives an e-mail, the mobile phone terminal 2 transmits, to the TV 1, a command <Report Mobile Event> [9] containing an event ID indicative of receiving of the e-mail. In a case where the TV 1 transmits an instruction for reading contents of e-mails through a user operation, the mobile phone terminal 2 starts an e-mail client and supplies an e-mail screen to the TV 1.

While the HDMI connection is being established between the mobile phone terminal 2 and the TV 1, the mobile phone terminal 2 can thus cause the TV 1 to display a status of the mobile phone terminal 2 in synchronization with a change in status of the mobile phone terminal 2. Since an event screen indicative of a status of the mobile phone terminal 2 is displayed by the TV 1, a user can check a status of the mobile phone terminal 2 even in a case where the user is far away from the mobile phone terminal 2.

In a case where the mobile phone terminal 2 has received a request from the TV 1 through a user operation with respect to the TV 1, the mobile phone terminal 2 can perform a process which is requested by the user via the TV 1. A user can therefore request a designated process to the mobile phone terminal 2, instead of directly operating the mobile phone terminal 2, and the mobile phone terminal 2 can perform the designated process.

Note that the displaying of a status of the mobile phone terminal 2 by the TV 1 is not limited to being triggered by (i) the change in status of the mobile phone terminal 2 and (ii) the receipt of a request from the TV 1 by the mobile phone terminal 2. The mobile phone terminal 2 can cause the TV 1 to display a status of the mobile phone terminal 2 in synchronization with an HDMI connection having been established between the mobile phone terminal 2 and the TV 1 is established.

Examples, of the status of the mobile phone terminal 2 to be displayed by the TV 1 when the HDMI connection has been established between the mobile phone terminal 2 and the TV 1, encompass the number of unattended incoming phone calls and the number of new e-mails. In this case, (A) (i) a change in status in which the HDMI connection has been established between the mobile phone terminal 2 and the TV 1 and (ii) an event ID are stored in the RAM 226 of the mobile phone terminal 2 so as to be associated with each other (see Table 2) and (B) processing content of the TV 1 is stored in the RAM 117 of the TV 1 so as to be associated with the event ID (see Table 4). This makes it possible that the mobile phone terminal 2 causes the TV 1 to display the number of unattended incoming phone calls and the number of new e-mails.

Alternatively, the mobile phone terminal 2 can be configured so that (i), in a case where a status of the mobile phone terminal 2 has been changed and the HDMI connection has been established between the mobile phone terminal 2 and the TV 1, the mobile phone terminal 2 transmits, before the mobile phone terminal 2 causes the TV 1 to display an event screen, to the TV 1a CEC command <Give Device Power Status> so as to determine whether or not the TV 1 is turned on and (ii), in a case where it is determined that the TV 1 is not turned on, a starting command <TextView On> is transmitted to the TV 1. This makes it possible to prevent an event screen from not being displayed. A user can therefore check a status of the mobile phone terminal 2 on a screen of the TV 1 without caring about whether or not the TV 1 is turned on.

Status designation information (event ID) has been exemplified by the status designation information which designates each status of the mobile phone terminal 2 shown in Table 2. The present invention is, however, not limited to this. For example, a status of the battery 219 of the mobile phone terminal 2, i.e., a remaining battery level detected by the remaining battery level detecting section 218 can be employed as the status designation information. This makes it possible to cause the TV 1 to display a remaining battery level of the mobile phone terminal 2.

Alternatively, text data, which is automatically push-distributed to the mobile phone terminal 2, can be employed as the status designation information (event ID). On a screen of the TV 1, a user can check text data, to be automatically displayed to the mobile phone terminal 2, such as weather information and news, without the need for the user to be near the mobile phone terminal 2.

(Controlling TV and Source Device with Use of Portable Information Terminal)

FIG. 14 is a view illustrating a configuration of a system 10' that is capable of operating a TV 1 with use of a portable information terminal 5. As illustrated in FIG. 14, the system 10' includes the TV 1, a source device 2, a portable information terminal 5, and a router 7. Examples of the mobile phone terminal 2 encompass a source device, other than the mobile phone terminal, such as a recording device. Examples of the TV 1 encompass a stationary TV, which is used by being connected to a commercial power source and a battery integrated portable TV (including a monitor that playbacks a video transmitted, via a wireless LAN, from an external tuner).

In the system 10' illustrated in FIG. 14, the TV 1 and the mobile phone terminal 2 are connected to each other via an HDMI cable 3. Similarly to the system 10 illustrated in (a) of FIG. 2, the TV 1 and the mobile phone terminal 2 control each other with use of a CEC command transmitted via the HDMI cable 3.

According to the system 10' illustrated in FIG. 14, the TV 1 and the portable information terminal 5 are configured to be communicable with each other. A communication medium, which supports the communication between the TV 1 and the portable information terminal 5, is not limited in particular. According to the present embodiment, the router 7 is provided between the TV 1 and the portable information terminal 5 so that (i) the TV 1 and the router 7 are connected to each other via an Ethernet cable 6 and (ii) the router 7 and the portable information terminal 5 are connected to each other via wireless LAN such as the IEEE 802.11 series. Alternatively, in a case where the TV 1 has a wireless LAN interface, it is also possible to employ (i) a configuration in which the TV 1 and the router 7 are connected via a wireless LAN or (ii) a configuration in which the TV 1 and the portable information terminal 5 are connected via a wireless LAN instead of providing the router 7 therebetween.

It is preferable that the TV 1 and the portable information terminal 5 support UPnP (Universal Plug and Play). This allows the TV 1, which is connected to the router 7 via a protocol such as SDDP, to be automatically detected when the portable information terminal 5 enters a service area of the router 7. During such automatic detection, the portable information terminal 5 acquires a name of the TV 1.

The portable information terminal 5 is installed with an application for causing the portable information terminal 5 to function as a remote control of the TV 1 (hereinafter, referred to as "remote controller application"). It becomes possible to operate (IP control) the TV 1 via the portable information terminal 5, (i) in a case where the TV 1 is detected after the remote controller application is started or (ii) in a case where the remote controller application is started after the TV 1 is detected. Note that, in a case where there are a plurality of UPnP compatible devices such as the TV 1 on the LAN, the portable information terminal 5 displays a list of names of those UPnP compatible devices so that the user selects a device to be operated.

(a) of FIG. 15 illustrates an example display screen that is displayed on a touch panel of the mobile phone terminal 5 and is generated by a remote controller application operable on the portable information terminal 5. This display screen is an emulated remote controller. The display screen has various keys for operating the TV 1 such as a power key indicated by "TV power", volume adjustment keys indicated by "−" and "+", and channel keys indicated by "1" through "12" and their respective broadcasting station names. For example, in a case where a channel key indicated by the number "1" is pressed, the remote controller application transmits, to the TV 1, a control command that instructs the TV 1 to switch the channel into Channel 1. The TV 1 switches the channel into Channel 1 in response to a received control command. At this time, in the TV 1, the Ethernet I/F 115 and the CPU 118 illustrated in FIG. 4 each serve as control command receiving means.

The remote controller application further has a function to operate the mobile phone terminal 2, in addition to the function to operate the TV 1. More specifically, in a case where a "link operation" key (located on a lower part of the display screen illustrated in (a) of FIG. 15) is pressed, a display screen illustrated in (b) of FIG. 15 appears. The display screen illustrated in (b) of FIG. 15 secures various keys for operating the mobile phone terminal 2, such as a rewind key, a playback key, and a fast forward key. For example, in a case where the playback key is pressed, the remote controller application transmits, to the TV 1, a control command that instructs the mobile phone terminal 2 to start playing back a subject content. The TV 1 converts a received control command to a corresponding CEC command, and then transmits the obtained CEC command to the mobile phone terminal 2. The mobile phone terminal 2 starts to play back the subject content in response to the received CEC command. Note that, in the TV 1, the Ethernet I/F 115, the CPU 118, and the HDMI receiver 100 (see FIG. 4) each serve as control command transferring means.

Alternatively, a display screen for operating the mobile phone terminal 2 can be displayed as follows. Specifically, the TV 1 provides the portable information terminal 5 with a notification of the logical address and/or the device type of the mobile phone terminal so that the remote controller application operating on the portable information terminal 5 displays a display screen in accordance with the logical address and/or device type of the mobile phone terminal 2. This allows the portable information terminal 5 to serve as a remote controller suitable for operating the mobile phone terminal 2 connected to the TV 1 via HDMI, regardless of type of the mobile phone terminal 2 which is connected to the TV 1 via HDMI.

Note that the remote controller application operating on the portable information terminal 5 is basically an emulated remote controller of a conventional infrared ray remote controller. However, the remote controller application can further have functions that the conventional infrared ray remote controllers have not had. For example, it is possible for the remote controller application to have the following further functions, other than the functions which the conventional infrared ray remote controllers have had.

1. URL jumping function, i.e., a function to start a web browser operating on the TV 1 and to access a designated URL.

2. TV status acquisition function, i.e., a function to acquire status information of, setting information of, and event information of the TV 1.

3. Text input function, i.e., a function to accept entry of a character string via a software keyboard and to transmit such an entered character string to the TV 1.

4. Information notification function, i.e., a function to provide the TV 1 with a notification of an event that has occurred in the portable information terminal 5, such as an event in which an incoming phone call or an e-mail has been received.

5. Seamless searching function, i.e., a function to display, in accordance with a keyword, results which have been searched from program information, a video recording list, VOD titles, and the Internet.

6. Friendly name setting function, i.e., a function to set a friendly name (device list name) on a TV 1 side with use of the portable information terminal 5.

The foregoing description has discussed a case where the portable information terminal 5 and the mobile phone terminal 2 communicate via the router 7 and the TV 1. However, it is also possible to employ a configuration in which the portable information terminal 5 directly communicates with the mobile phone terminal 2 via a wireless LAN. In this case, it is possible to directly transmit a control command for operating the mobile phone terminal 2 from the portable information terminal 5 to the mobile phone terminal 2.

The present invention is applicable to a system 10' including the portable information terminal 5 having such function.

(Program and Recording Medium)

Finally, blocks of the mobile phone terminal 2 and the TV 1 can be accomplished by way of hardware with use of a logic circuit formed on an integrated circuit (IC chip) or by way of software as carried out by a CPU (Central Processing Unit).

In the latter case, the mobile phone terminal 2 and the TV 1 includes a CPU and memory devices (recording medium). The CPU executes instructions in programs for performing functions. Examples of the memory devices encompass a ROM (Read Only Memory) in which programs are stored, a RAM (Random Access Memory) to which the programs are loaded, and a memory in which the programs and various data are stored. The object of the present invention can also be achieved by (A) mounting, on the mobile phone terminal 2 and the TV 1, a computer-readable recording medium storing a control program code (executable program, intermediate code program, or source program) for the mobile phone terminal 2 and the TV 1, which are software for performing the aforementioned functions, and (B) retrieving and executing, with use of the computer (or CPU, MPU), the program code stored in the recording medium.

The recording medium can be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; a semiconductor memory, such as a mask ROM/EPROM/EEPROM/flash ROM; or logic circuits such as a PLD (Programmable logic device) or FPGA (Field Programmable Gate Array).

The mobile phone terminal 2 and the TV 1 can be arranged to be connectable to a communications network so that the program code can be supplied via the communications network. The communications network is not limited in any particular manner, provided that the communications network is configured to transmit the program code. Examples of the communications network encompass the Internet, an intranet, extranet, LAN, ISDN, VAN, CATV communications network, virtual dedicated network (Virtual Private Network), telephone line network, mobile communications network, or satellite communications network. The transfer medium which makes up the communications network is also not limited to a set arrangement or kind, provided that the transfer medium is capable of supplying the program code, and can be, for example, wired line, such as IEEE1394, USB, electric power line, cable TV line, telephone line, or ADSL (Asymmetric Digital Subscriber Line); or wireless, such as infrared radiation (IrDA, remote control), Bluetooth (Registered Trademark), IEEE802.11 wireless, HDR (High Data Rate), NFC (Near Field Communication), DLNA (Digital Living Network Alliance), mobile telephone network, satellite line, or terrestrial digital network.

Note that a connection mode between the TV 1 and the mobile phone terminal 2 is not limited to the wired communications illustrated in FIGS. 2 and 3. The TV 1 and the mobile phone terminal 2 can be connected wirelessly, or can be connected by both a wired transmission medium and a wireless transmission medium.

The present invention is not limited to the description of the embodiment above, and can be modified in numerous ways by a skilled person as long as such modification falls within the scope of the claims. An embodiment derived from a proper combination of technical means is also encompassed in the technical scope of the present invention, as long as the embodiment is appropriately modified within the scope recited in the claims.

(Preferred Embodiment of the Present Invention)

A source device in accordance with the present invention is for supplying, to a sink device, content to be outputted by the sink device, and the source device includes command issue means for issuing a command which (A) contains status designation information which designates a status of the source device and (B) causes the sink device to display the status of the source device.

According to the arrangement, the sink device displays the status of the source device on the basis of the status designation information contained in the command. A user can therefore know the status of the source device by watching such display of the sink device. That is, it is possible to more surely provide the user with a notification of the status of the source device.

When the status of the source device is changed, the command issue means can issue the command containing status designation information which designates a changed status of the source device, or, when receiving a request from the sink device, the command issue means can issue the command containing status designation information which designates a status of the source device, which status corresponds to a status which the source device has when the command issue means receives the request from the sink device. Alternatively, when a connection between the source device and the sink device is established, the command issue means can issue the command containing status designation information which designates a status of the source device, which status corresponds to a status which the source deice has when the connection is established between the command issue means and the sink device. In any case, it is possible to more surely provide the user with a notification of the status of the source device.

It is preferable that commands issued by the command issue means contain respective pieces of priority order designation information designating which command contains status designation information that designates a status that should be preferentially displayed in a case where the sink device displays a status of the source device.

According to the arrangement, it is possible to designate, from the source device, a status which should be preferentially displayed by the sink device.

A sink device in accordance with the present invention is for outputting content supplied from a source device, and the sink device includes status display means for displaying, in accordance with a command which (A) is issued by the source device and (B) contains status designation information which designates a status of the source device, the status of the source device designated by the status designation information.

According to the arrangement, the sink device displays the status of the source device on the basis of the status designation information contained in the command. A user can therefore know the status of the source device by watching such display content of the sink device. That is, it is possible to more surely provide the user with a notification of the status of the source device.

It is preferable that a command issued by the command issue means in the source device of the present invention have display time period designation information which designates a display time period in which the sink device displays a status of the source device.

According to the arrangement, it is possible to designate, from the source device, the display time period in which the sink device displays the status of the source device.

It is preferable that the command issued by the command issue means contains display location designation information which designates a location on a display where the sink device displays the status of the source device.

According to the arrangement, it is possible to designate, from the source device, a location (a location on the display) where the sink device display a status of the source device. This makes it possible to, for example, display a status of the source device so as not to hide a video which is originally displayed on the display.

It is preferable that the command issued by the command issue means contains icon designation information which designates an icon to be displayed, by the sink device, together with the status of the source device.

According to the arrangement, it is possible to designate, from the source device, an icon which should be displayed together with a status of the source device by the sink device.

It is preferable that the command issued by the command issue means contains sound effect designation information which designates a sound effect to be outputted, by the sink device, together with the status of the source device.

According to the arrangement, it is possible to designate, from the source device, a sound effect to be outputted together with a status of the source device by the sink device.

It is preferable that the command issued by the command issue means contains display mode designation information which designates a display mode in which the sink device displays the status of the source device.

According to the arrangement, it is possible to designate, from the source device, a display mode to be displayed when the sink device displays a status of the source device.

It is preferable that the command issued by the command issue means contains guide display designation information which designates whether or not the sink device displays, together with the status of the source device, an operation guide which shows how to operate the sink device.

According to the arrangement, it is possible to designate, from the source device, whether or not the sink device displays the operation guide.

The source device of the present invention further includes telephonic communication means for establishing communication, the command issue means issuing the command which contains status designation information indicating that the telephonic communication means is receiving a phone call.

According to the arrangement, it is possible to provide a user via the sink device with a notification in which the source device is receiving the phone call.

It is preferable that the command issue means issues the command which contains status designation information indicative of an incoming phone call log(s) of the telephonic communication means.

According to the arrangement, it is possible to present the incoming phone call log(s) of the source device to a user via the sink device.

It is preferable that e-mail receiving means for receiving an e-mail, the command issue means issuing the command which contains status designation information indicating that the e-mail receiving means has received an e-mail.

According to the arrangement, it is possible to provide a user via the sink device with a notification in which the source device has received the e-mail.

It is preferable that the command issue means issues the command which contains status designation information indicative of an incoming e-mail log(s) of the e-mail receiving means.

According to the arrangement, it is possible to present an incoming e-mail log(s) of the source device to a user via the sink device.

It is preferable that: the source device in accordance with the present invention further include a power source for supplying electric power to sections of the source device, the command issue means issuing the command which contains status designation information indicative of a status of the power source.

According to the arrangement, it is possible to provide a user via the sink device with a notification of the status of the power source of the source device (e.g., a remaining battery level).

It is preferable that processing means for carrying out a process which is designated, in accordance with the command issued by the sink device, by process designation information contained in the command, the process designation information designating the process to be carried out by the source device.

According to the arrangement, it is possible, for example, to cause the source device to carry out a predetermined process by operating the sink device, without operating the source device.

It is preferable that the source device in accordance with the present invention further include video signal supply means for supplying, to the sink device, a video signal generated by the processing means carrying out a process designated by the process designation information.

According to the arrangement, for example, it is possible to output, via the sink device, a video obtained by causing the source device to carry out a predetermined process.

The sink device in accordance with the present invention can be connected to the source device via HDMI (High-Definition Multimedia Interface), and the command can be a CEC (Consumer Electronics Control) command.

It is desired that the sink device in accordance with the present invention include at least one of (A) control command receiving means for receiving a first control command which is sent from a portable information terminal and is a control command for operating the sink device and (B) control command transferring means for converting a second control command, which is sent from the portable information terminal and is a control command for operating the source device, into a CEC command corresponding to the second control command, and for transmitting the CEC command to the source device. Further, the sink device is preferably a television receiver.

According to the arrangement, it is possible to operate the sink device or the source device from a mobile information terminal.

Industrial Applicability

The present invention is suitably applicable to a source device connected to a sink device via an HDMI cable or the like, particularly, to a portable source device.

Reference Signs List

| | |
|---|---|
| 1 | TV |
| 11d | HDMI switch |
| 100 | HDMI receiver |
| 151 | TMDS receiver |
| 152 | CEC•I/F |
| 153 | DDC•I/F |
| 154 | HPD control section |
| 155 | 5V power detecting section |
| 156 | EDID storage section |
| 106 | OSD generating section |
| 117 | RAM |
| 118 | CPU |
| 305 | UI section (status display means) |
| 307 | input source selection section |
| 2 | mobile phone terminal |
| 21 | HDMI output terminal |
| 200 | HDMI transmitter |
| 251 | TMDS transmitter (video signal supply means) |
| 252 | CEC•I/F |
| 253 | DDC•I/F |
| 254 | HPD detecting section |
| 255 | 5V electric power control section |
| 201 | micro USB terminal |
| 202 | micro USB•I/F |
| 203 | Bluetooth•I/F |
| 204 | WLAN•I/F |
| 205 | memory card |
| 206 | USIM card |
| 207 | GPS |
| 210 | data processing section |
| 211 | RF section |
| 212 | audio CODEC section |
| 213 | main controller |
| 301 | telephonic communication application (telephonic communication means) |
| 302 | e-mail client (e-mail receiving means) |
| 303 | push information distribution service client |
| 304 | command processing section (command issue means, processing means) |
| 214 | RTC section |
| 215 | key scanning section |
| 216 | charging circuit |

Reference Signs List

| | |
|---|---|
| 217 | power regulator |
| 218 | remaining battery level detecting section |
| 219 | battery (power source) |
| 220 | LCD controller |
| 221 | LCD |
| 222 | touch panel |
| 223 | camera |
| 224 | DTV section |
| 225 | FLASH memory |
| 226 | RAM |
| 227 | voice input section |
| 228 | voice output section |

The invention claimed is:

1. A source device for supplying, to a sink device, content to be outputted by the sink device, the source device comprising:
a command issuing section configured to issue a plurality of commands to the source device in a case where the status of the source device is changed, each of the plurality of commands (A) containing status designation information indicative of a changed status of the source device and (B) causing the sink device to display the changed status of the source device,
each of the plurality of commands issued by the command issuing section containing:
priority order designation information designating a display priority order in which the status of the source device, as is indicated by the each of the plurality of commands is displayed by the sink device;
display time period designation information which designates a time period in which the sink device displays the status of the source device; and
display location designation information which designates a location on a display where the sink device displays the status of the source device.

2. The source device as set forth in claim 1, wherein each of the plurality of commands issued by the command issuing section contains icon designation information which designates an icon to be displayed, by the sink device, together with the status of the source device.

3. The source device as set forth in claim 1, wherein each of the plurality of commands issued by the command issuing section contains sound effect designation information which designates a sound effect to be outputted, by the sink device, together with the status of the source device.

4. The source device as set forth in claim 1, wherein each of the plurality of commands issued by the command issuing section contains display mode designation information which designates a display mode in which the sink device displays the status of the source device.

5. The source device as set forth in claim 1, wherein each of the plurality of commands issued by the command issuing section contains guide display designation information which designates whether or not the sink device displays, together with the status of the source device, an operation guide which shows how to operate the sink device.

6. The source device as set forth in claim 1, further comprising:
a telephonic communication section configured to establish communication,
the command issuing section issuing the plurality of commands each of which contains status designation information indicating that the telephonic communication section is receiving a phone call.

7. The source device as set forth in claim 6, wherein the command issuing section issues the plurality of commands each of which contains status designation information indicative of an incoming phone call log(s) of the telephonic communication section.

8. The source device as set forth in claim 1, further comprising:
an e-mail receiving section configured to receive an e-mail, the command issuing section issuing the plurality of commands each of which contains status designation information indicating that the e-mail receiving section has received an e-mail.

9. The source device as set forth in claim 8, wherein the command issuing section issues the plurality of commands each of which contains status designation information indicative of at least one incoming e-mail log of the e-mail receiving section.

10. The source device as set forth in claim 1, further comprising:
a power source for supplying electric power to sections of the source device,
the command issuing section issuing the plurality of commands each of which contains status designation information indicative of a status of the power source.

11. The source device as set forth in claim 1, further comprising:
a processing section configured to carry out a process which is designated, in accordance with the plurality of commands issued by the sink device, by process designation information contained in each of the plurality of commands, the process designation information designating the process to be carried out by the source device.

12. The source device as set forth in claim 1, further comprising
a video signal supplying section configured to supply, to the sink device, a video signal generated by the processing section carrying out a process designated by the process designation information.

13. The source device as set forth in claim 1, wherein:
the sink device is connected to the source device via HDMI (High-Definition Multimedia Interface); and
the plurality of commands are a CEC (Consumer Electronics Control) command.

14. A non-transitory computer-readable recording medium in which a program is recorded which causes (A) a computer to operate as a source device as recited in claim 1 and (B) the computer to function as each section included in the source device.

15. A sink device for outputting content supplied from a source device, the sink device comprising:
a status displaying section configured to display, in accordance with a plurality of commands each of which (A) is issued to the sink device by the source device in a case where the status of the source device is changed and (B) contains status designation information indicative of a changed status of the source device, the changed status of the source device designated by the status designation information,
each of the plurality of commands issued by the source device containing:
priority order designation information designating a display priority order in which the status of the source device as indicated by the each of the plurality of commands is displayed by the sink device;
display time period designation information which designates a time period in which the sink device displays the status of the source device; and
display location designation information which designates a location on a display where the sink device displays the status of the source device,
the status displaying section displaying the changed status of the source device in accordance with the priority order designation information, the display time period designation information, and the display location designation information.

16. The sink device as set forth in claim 15, further comprising
at least one of (A) a control command receiving section configured to receive a first control command which is sent from a portable information terminal and is a control command for operating the sink device and (B) a control command transferring section configured to (i) convert a second control command, which is sent from the portable information terminal and is a control command for operating the source device, into a CEC command corresponding to the second control command, and (ii) transmit the CEC command to the source device.

17. The sink device as set forth in claim 15, wherein the sink device is a television receiver.

18. A system comprising:
a source device including:
a command issuing section configured to issue a plurality of commands in a case where the status of the source device is changed, each of the plurality of commands (A) containing status designation information indicative of a changed status of the source device and (B) causing a sink device to display the changed status of the source device,
each of the plurality of commands issued by the command issuing section containing:
priority order designation information designating a display priority order in which the status of the source device as indicated by the each of the plurality of commands is displayed by the sink device,
display time period designation information which designates a time period in which the sink device displays the status of the source device, and
display location designation information which designates a location on a display where the sink device displays the status of the source device; and
a sink device including:
a status displaying section configured to display, in accordance with the plurality of commands, the changed status of the source device designated by the status designation information.

* * * * *